US012385679B2

(12) United States Patent
Kokugan et al.

(10) Patent No.: US 12,385,679 B2
(45) Date of Patent: Aug. 12, 2025

(54) REFRIGERANT QUANTITY DIAGNOSIS DEVICE, REFRIGERANT SYSTEM, AND REFRIGERANT QUANTITY DIAGNOSIS METHOD

(71) Applicant: Hitachi Global Life Solutions, Inc., Tokyo (JP)

(72) Inventors: Yoko Kokugan, Tokyo (JP); Hiroshi Kusumoto, Tokyo (JP); Keiko Oka, Tokyo (JP); Hisae Shibuya, Tokyo (JP); Noriyuki Tokura, Tokyo (JP); Norikazu Sasaki, Tokyo (JP); Kazuhiro Tsuchihashi, Tokyo (JP); Eiji Ogata, Tokyo (JP)

(73) Assignee: Hitachi Global Life Solutions, Inc., Tokyo (JP)

( * ) Notice: Subject to any disclaimer, the term of this patent is extended or adjusted under 35 U.S.C. 154(b) by 420 days.

(21) Appl. No.: 18/077,737

(22) Filed: Dec. 8, 2022

(65) Prior Publication Data

US 2023/0304713 A1     Sep. 28, 2023

(30) Foreign Application Priority Data

Mar. 24, 2022   (JP) .................................. 2022-048845

(51) Int. Cl.
*F25B 49/02* (2006.01)
*B60H 1/00* (2006.01)
*B61D 27/00* (2006.01)

(52) U.S. Cl.
CPC ......... *F25B 49/02* (2013.01); *B60H 1/00978* (2013.01); *B61D 27/0018* (2013.01); *F25B 2500/19* (2013.01); *F25B 2500/222* (2013.01)

(58) Field of Classification Search
CPC .......................... F25B 13/00; F25B 2500/24; F25B 2500/222; F25B 2500/19; B60H 1/00585; B60H 1/00978
See application file for complete search history.

(56) References Cited

U.S. PATENT DOCUMENTS

2022/0268503 A1    8/2022   Yoshimi et al.
2024/0353160 A1*  10/2024   Okumura ................. F24F 11/61

FOREIGN PATENT DOCUMENTS

JP          2021-42949 A        3/2021

* cited by examiner

*Primary Examiner* — Ana M Vazquez
(74) *Attorney, Agent, or Firm* — Crowell & Moring LLP

(57) ABSTRACT

A refrigerant quantity diagnosis device includes: an evaluation value calculation part that calculates a refrigerant quantity index evaluation value including a ratio of a measured refrigerant quantity index value to a reference refrigerant quantity index value in each of a normal period and a determination period; and a refrigerant quantity diagnosis part that diagnoses a refrigerant quantity based on the refrigerant quantity index evaluation value. The evaluation value calculation part calculates a first refrigerant quantity index evaluation value in the normal period and a second refrigerant quantity index evaluation value in the determination period, based on respective reference refrigerant quantity index values having respective values associated with an operating condition of interest, and respective measured refrigerant quantity index values. The refrigerant quantity diagnosis part compares information on the first refrigerant quantity index evaluation value with that on the second one and thereby diagnoses the refrigerant quantity.

14 Claims, 11 Drawing Sheets

REFRIGERANT QUANTITY DIAGNOSIS DEVICE, REFRIGERANT SYSTEM, AND REFRIGERANT QUANTITY DIAGNOSIS METHOD

CROSS REFERENCE TO RELATED APPLICATIONS

This application claims the benefit of Japanese Patent Application No. 2022-048845 filed on Mar. 24, 2022, the disclosure of which is incorporated herein by reference.

BACKGROUND OF THE INVENTION

1. Field of the Invention

The present invention relates to technology of a refrigerant quantity diagnosis device, a refrigerant system, and a refrigerant quantity diagnosis method.

2. Description of the Related Art

A number of cooling, refrigerating, and air conditioning systems have been working using a refrigerant such as chlorofluorocarbon. The refrigerant contributes to an increase in global warming. Control of leakage of the refrigerant into atmosphere is thus required. Such refrigerant leakage into atmosphere occurs, for example, when a refrigerant charged in a device such as a refrigerating machine and an air conditioner is disposed of and is not properly recovered. Another case which often occurs is that a refrigerant charged in a device leaks while being used. There is thus a need for detecting refrigerant leakage during use of a device of interest.

In response to the above-described, Japanese Laid-Open Patent Application, Publication No. 2021-042949 (which may also be referred to as Patent Document 1 hereinafter) discloses a refrigerant quantity determination device, a method, and a program that "comprises an operation data acquisition unit for acquiring operation data of an air conditioning system, a calculation unit for calculating a refrigerant quantity index value from the acquired operation data, an inference unit for inferring information related to correction of the refrigerant quantity index value by using at least one of the acquired operation data and the calculated refrigerant quantity index value and a correction model, and a determination unit for determining a refrigerant quantity of the air conditioning system on the basis of the information related to the correction of the refrigerant quantity index value" (see Abstract).

According to the technology described in Patent Document 1, a refrigerant quantity of an air conditioning system can be determined based on a difference between an inferred value of a refrigerant quantity index value in a normal period inferred by the inference unit and a refrigerant quantity index value calculated based on previous operating data, or a ratio of the inferred value to the refrigerant quantity index value.

[Patent Document 1] Japanese Laid-Open Patent Application, Publication No. 2021-042949

SUMMARY OF THE INVENTION

An operating condition of a device such as an air conditioning system often varies in accordance with a surrounding environment, a user's requirement, or the like. This means that data on an operating state (data including an operating condition) of the device possibly contains transitional data acquired during a period between an original operating condition and a designated operating condition. In particular, when a device used has a long sampling period or a number of elements such as an indoor unit and an exterior unit, it is difficult to determine whether data is acquired in a transitional period or a stable period.

A refrigerant charged in a device has in some cases such a property that it is difficult to detect of leakage of the refrigerant based on a temperature or a pressure thereof due to difference in operating conditions.

When a correction model is applied to the operating condition described above, the technique described in Patent Document 1 may not successfully determine a correct refrigerant quantity in some cases. Patent Document 1 also teaches that, when a correction of an input item is not complete, data of interest is compared with a previously-obtained refrigerant quantity index value corresponding to an operating condition similar to that when the determination is made. When a device having a plurality of indoor units or exterior units is used, however, data assuring that those units work similarly to each other may not be present. That is, all of a plurality of the indoor units or the exterior units do not always work in the same operating states. Additionally, Patent Document 1 discloses a technique of avoiding a false detection by utilizing AI (Artificial Intelligence). The technique requires, however, a means with a high calculation load.

In light of the background as described above, the present invention has been made in an attempt to provide a refrigerant quantity diagnosis device, a refrigerant system, and a refrigerant quantity diagnosis method, each capable of reducing a processing load.

In order to solve the problems described above, the present invention provides a refrigerant quantity diagnosis device for an air conditioning system including: a data collection part configured to acquire operating state data on the air conditioning system; an evaluation value calculation part configured to calculate a refrigerant quantity index evaluation value that is a ratio of (i) a measured refrigerant quantity index value which is an index value of a quantity of a refrigerant in the air conditioning system and is calculated based on the acquired operating state data, to (ii) a reference refrigerant quantity index value which is a previously-calculated index value of the refrigerant quantity in the air conditioning system, or a difference value between (i) the measured refrigerant quantity index value and (ii) the reference refrigerant quantity index value; and a refrigerant quantity diagnosis part configured to diagnose the refrigerant quantity in the air conditioning system, based on the refrigerant quantity index evaluation value. The reference refrigerant quantity index value is associated with at least one operating condition of the air conditioning system and is also associated with a prescribed value of the associated operating condition. The evaluation value calculation part is configured to: calculate a first refrigerant quantity index evaluation value as the refrigerant quantity index evaluation value, based on the reference refrigerant quantity index value having a value associated with an operating condition of interest and also based on the measured refrigerant quantity index value, in a first period in which it is previously estimated that no refrigerant leakage of the refrigerant in the air conditioning system has occurred; and calculate a second refrigerant quantity index evaluation value as the refrigerant quantity index evaluation value, based on the reference refrigerant quantity index value having a value associated with the operating condition of interest and also based on the measured refrigerant quantity index value, in a second period in which the refrigerant quantity is diagnosed. The refrigerant quantity diagnosis part is configured to compare information on the first refrigerant quantity index evaluation value with information on the second refrigerant quantity index evaluation value and thereby diagnose the refrigerant quantity in the air conditioning system.

Other means for solving the above-described problems will be described hereinafter in the embodiments of the present invention.

The present invention can provide a refrigerant quantity diagnosis device, a refrigerant system, and a refrigerant quantity diagnosis method, each capable of reducing a processing load.

DETAILED DESCRIPTION OF THE EMBODIMENTS

Embodiments of the present invention are described next in detail with reference to the related drawings according to the necessity.

The present invention is applicable not only to those described in embodiments below but also to any heat pump apparatus in which a refrigerant is charged for cooling or heating. Each of the embodiments can be applied to any air conditioning system, for example, a multi-type air conditioner such as that for building use, a central air-conditioning system which has a chiller as a heat source, an air conditioner for office use (for business use), and a room-air conditioner. Each of the embodiments is also applicable to, in addition to usage for cooling and heating, a freezing and refrigeration system for a refrigerator or the like. Each of the embodiments can be applied to a heat pump water heater, too.

Each of the embodiments mainly describes a cooling operation in an air conditioning system including a plurality of indoor units. The air conditioning system may or may not perform the cooling operation alone. When the air conditioning system also performs a heating operation, it is required that operating state data on a cooling load as well as a heating load be taken into account.

A method of diagnosing a refrigerant quantity of an air conditioning system according to a first embodiment of the present invention is described below in detail with reference to FIG. 1 to FIG. 7B.

First Embodiment

A first embodiment of the present invention is described with reference to FIG. 1 to FIG. 7B.

(Refrigerant System 1)

Figure 1:
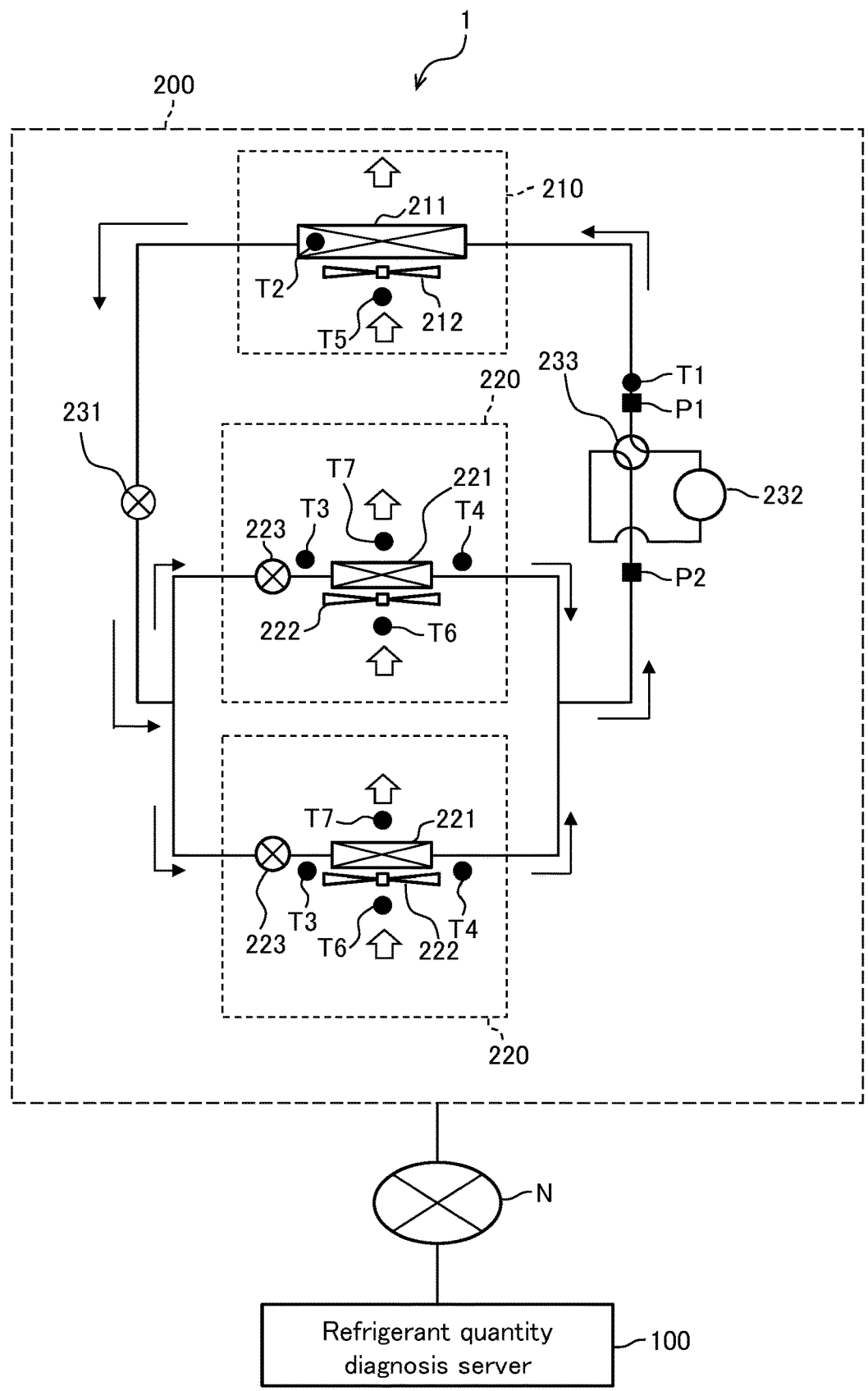
FIG. 1 is a diagram illustrating a refrigerant system according to a first embodiment.

FIG. 1 is a diagram illustrating a refrigerant system 1 according to the first embodiment.

The refrigerant system 1 includes a refrigerant quantity diagnosis server (which may also be referred to as a refrigerant quantity diagnosis device) 100 and an air conditioning system 200. In the refrigerant system 1, a control board (not illustrated) of the air conditioning system 200 is communicably connected to the refrigerant quantity diagnosis server 100 via a network N. That is, the refrigerant quantity diagnosis server 100 acquires data on an operating state from the air conditioning system 200 via communication. The operating state data includes a signal from a sensor of various types installed in the air conditioning system 200, a control signal, and data on, such as, for example, setting and installation environment. More specifically, the operating state data: is log data which can be acquired from the air conditioning system 200; and includes operating data (a pressure, a temperature, and a power current) and a set value (for example, a set temperature, an amount of refrigerant charge in normal time, and an air flow rate of an indoor unit fan). The operating state data thus includes raw data which can be acquired from the air conditioning system 200 that is actually operating. Note that the operating state data also includes data on an operating condition to be described hereinafter.

The refrigerant quantity diagnosis server 100 determines a change in a quantity of refrigerant, based on the operating state data acquired from the air conditioning system 200. The refrigerant quantity diagnosis server 100 will be described hereinafter.

(Air Conditioning System 200)

The air conditioning system 200 includes an exterior unit 210 and a plurality of indoor units 220. FIG. 1 illustrates an example in which the air conditioning system 200 includes one exterior unit 210 and two indoor units 220. The number of the exterior units 210 or the number of the indoor units 220 is not limited to that illustrated in FIG. 1.

The exterior unit 210 includes: a condenser 211 that is an exterior heat exchanger; and a condenser fan 212 that is an exterior fan.

Each of the indoor units 220 includes: an evaporator 221 that is an indoor heat exchanger; an evaporator fan 222 that is an indoor fan; and an expansion valve 223.

The condenser 211 included in the exterior unit 210 and the evaporator 221 and the expansion valve 223 each included in the indoor unit 220 are connected to a circular flow path in which a refrigerant is charged, to thereby constitute a refrigerant cycle. In FIG. 1, a flow of the refrigerant is indicated by arrows. Note that the arrows in FIG. 1 show a refrigerant flow in a case of cooling. In a case of heating, a refrigerant flow is in opposite direction. In a case of heating, the condenser 211 is substituted by an evaporator and the evaporator 221 is substituted by a condenser.

As illustrated in FIG. 1, an expansion valve 231 is disposed between an exit side of the condenser 211 and an entry side of each of the respective expansion valves 223 included in the indoor units 220. A compressor 232 is disposed between an exit side of each of the respective evaporators 221 included in the indoor units 220 and an entry side of the condenser 211 included in the exterior unit 210. A four-way valve 233: is disposed near the compressor 232; and controls a flow of the refrigerant flowing into the compressor 232 in heating and cooling.

The air conditioning system 200 includes: thermistors T1 to T7 each of which measures a temperature of a refrigerant pipe of interest and a surrounding air thereof; and pressure sensors P1 to P2. Each of the thermistors T1 to T7 and the pressure sensors P1 to P2 acquires data to be described below.

The terms used below such as a discharge, a suction, an entry, and an exit are in line with the flow of the refrigerant in cooling illustrated in FIG. 1.

The thermistor T1 measures a temperature of the refrigerant on a discharge side of the compressor 232 (a temperature of a discharged refrigerant).

The thermistor T2 measures a temperature at which heat is exchanged by the condenser 211.

The thermistor T3 measures an air temperature at an entry of the evaporator 221.

The thermistor T4 measures an air temperature at an exit of the evaporator 221.

The thermistor T5 measures an outside air temperature of such as a suction temperature of the condenser 211.

The pressure sensor P1 measures a discharge pressure of the compressor 232.

The pressure sensor P2 measures a suction pressure of the compressor 232.

In addition to the described above, other data can be transmitted to the refrigerant quantity diagnosis server 100, such as: a current value of the compressor 232, the condenser fan 212, and the evaporator fan 222; a rotation rate of the compressor 232; and a set value of various types, as the operating state data.

(Refrigerant Quantity Diagnosis Server 100)

Figure 2:
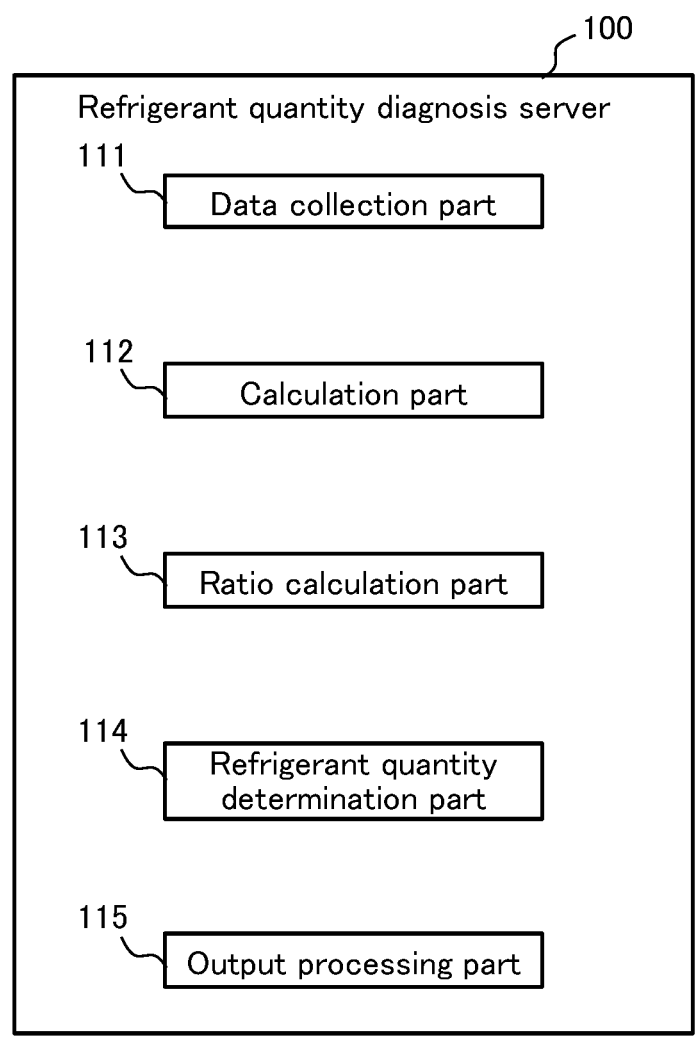
FIG. 2 is a diagram illustrating an example of a configuration of a refrigerant quantity diagnosis server according to the first embodiment.

FIG. 2 is a diagram illustrating an example of a configuration of the refrigerant quantity diagnosis server 100 according to the first embodiment. FIG. 1 is also referred to herein where appropriate.

The refrigerant quantity diagnosis server 100 includes a data collection part 111, a calculation part 112, a ratio calculation part (an evaluation value calculation part) 113, a refrigerant quantity determination part (a refrigerant quantity diagnosis part) 114, and an output processing part 115.

The data collection part 111 collects operating state data on the air conditioning system 200 via the network N. The data collection part 111 records the collected operating state data as history data in the auxiliary storage 130 (see FIG. 3).

More specifically, the data collection part 111 acquires operating state data on the air conditioning system 200 for a certain period of time in a normal period (a first period). The normal period used herein means a time period during which a refrigerant is estimated not to have leaked in the air conditioning system 200. It is assumed in this embodiment that the air conditioning system 200 is in the normal period for a prescribed time period after the air conditioning system 200 is started.

The data collection part 111 also acquires operating state data on the air conditioning system 200 in a determination period (a second period). The determination period used herein means a time period other than the normal period, in which whether or not there is a change in a refrigerant quantity is determined, to thereby diagnose the refrigerant quantity (a time period as a target for diagnosis of the refrigerant quantity). When there is a change in the refrigerant quantity in the determination period, compared with that in the normal period, leakage of the refrigerant is determined to have occurred.

The calculation part 112 calculates a measured refrigerant quantity index value for each operating condition, based on the operating state data collected in the normal period. The calculation part 112 also calculates a measured refrigerant quantity index value for each operating condition based on the operating state data collected in the determination period. The measured refrigerant quantity index value will be described hereinafter.

The ratio calculation part 113 calculates a ratio of a measured refrigerant quantity index value calculated in a normal period to a reference refrigerant quantity index value 131 previously stored in the auxiliary storage 130 (see FIG. 3) (which may also be hereinafter referred to as a normal time ratio (a refrigerant quantity index evaluation value)). Similarly, the ratio calculation part 113 calculates a ratio of a measured refrigerant quantity index value calculated in a determination period to the reference refrigerant quantity index value 131 stored in the the auxiliary storage 130 (which may also be hereinafter referred to as a determination time ratio (a refrigerant quantity index evaluation value). Each of the reference refrigerant quantity index value 131, the measured refrigerant quantity index value, the normal time ratio, and the determination time ratio will be described hereinafter.

The refrigerant quantity determination part 114 diagnoses a refrigerant quantity in the air conditioning system 200 based on the reference refrigerant quantity index value 131 (see FIG. 3) and a measured refrigerant quantity index value. More specifically, the refrigerant quantity determination part 114: compares a normal time ratio with a determination time ratio; and, when an absolute value of a difference between the two ratios exceeds a prescribed value, determines that there is a change in the refrigerant quantity. A processing performed by the refrigerant quantity determination part 114 will be described hereinafter.

Figure 3:
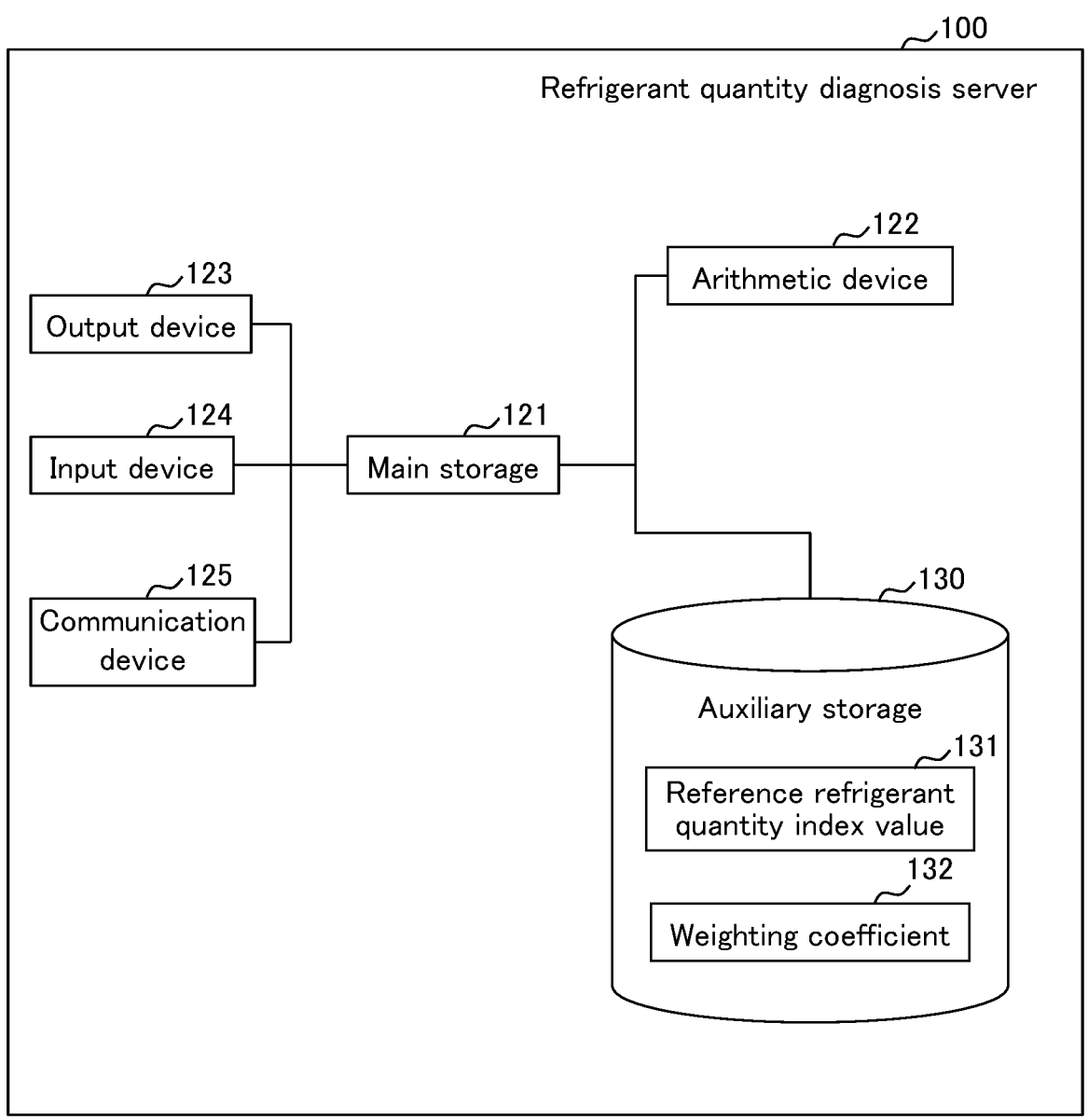
FIG. 3 is a diagram illustrating a hardware configuration of a refrigerant quantity diagnosis server according to the first embodiment.

Based on a result determined by the refrigerant quantity determination part 114 (a diagnosis result), more specifically, when it is determined that there is a change in the refrigerant quantity, the output processing part 115 outputs information showing that there is a change in the refrigerant quantity, to an output device (an output part) 123 (see FIG. 3).

(Hardware Configuration)

FIG. 3 is a diagram illustrating a hardware configuration of the refrigerant quantity diagnosis server 100 according to the first embodiment. FIG. 2 is also referred to herein where appropriate.

As illustrated in FIG. 3, the refrigerant quantity diagnosis server 100 includes a main storage 121, an arithmetic device 122, the auxiliary storage 130, the output device (the output part) 123, an input device 124, and a communication device 125.

The main storage 121 includes a RAM (Random Access Memory). The arithmetic device 122 includes a CPU (Central Processing Unit). The auxiliary storage 130 includes a HD (Hard Disk) and a SSD (Solid State Drive). The output device 123 includes a display and a printer. The input device 124 includes a keyboard and a mouse. The communication device 125 is a device for communicating with the air conditioning system 200.

A program stored in the auxiliary storage 130 is loaded into the main storage 121. The arithmetic device 122 executes the loaded program, to thereby realize the respective parts 111 to 115 illustrated in FIG. 2.

The main storage 121 stores therein data such as a normal time ratio and a determination time ratio, each as a result calculated by the ratio calculation part 113.

The auxiliary storage 130 stores therein the reference refrigerant quantity index value 131 which is a value relevant to a refrigerant quantity and is a reference value when a normal time ratio or a determination time ratio is calculated. The reference refrigerant quantity index value 131 is stored in association with an operating condition of the air conditioning system 200. Note that the reference refrigerant quantity index value 131 is associated with at least one operating condition. The operating condition will be described hereinafter. The reference refrigerant quantity index value 131 may be stored: in a form of map in which a value of an operating condition (an operating condition value) is associated with the reference refrigerant quantity index value 131; or in a form of function in which an operating condition is used as a parameter. Note that in the embodiment, a specific value of an operating condition is referred to as an operating condition value; and, when an operating condition is used as a parameter, the operating condition is referred to as it is.

Note that, when an operating condition value and the reference refrigerant quantity index value 131 are stored in association with each other in the form of map, it becomes easy to perform a processing of acquiring the reference refrigerant quantity index value 131 which has an operating condition value same as a measured refrigerant quantity index value, which will be described hereinafter. Further, when a relationship between an operating condition and the reference refrigerant quantity index value 131 is stored in the form of function, it becomes easier to perform a processing of acquiring the reference refrigerant quantity index value 131 which has an operating condition value same as a measured refrigerant quantity index value than that in the form of map, which will be described hereinafter.

The auxiliary storage 130 also stores therein a weighting coefficient 132 corresponding to an operating condition. The weighting coefficient 132: is used when the refrigerant quantity determination part 114 calculates a normal time ratio average value or a determination time ratio average value, each to be described hereinafter; and varies depending on the operating condition. The weighting coefficient 132 will be described hereinafter.

Each of the reference refrigerant quantity index value 131 and the weighting coefficient 132 may be stored in a database provided separately from the refrigerant quantity diagnosis server 100.

(Refrigerant Quantity Index Value)

Description below is made with reference to FIG. 1 where appropriate.

In this embodiment, a refrigerant quantity index value is an index value of a quantity of a refrigerant in the air conditioning system 200. More specifically, the refrigerant quantity index value is a value representing a correlation between a circulation flow rate of the refrigerant and a state of the refrigerant at the exit side of the condenser 211. The refrigerant quantity index value includes a measured refrigerant quantity index value and the reference refrigerant quantity index value 131. Note that the reference refrigerant quantity index value 131 is an ideal refrigerant quantity index value when refrigerant leakage has not occurred. That is, of the refrigerant quantity index value, an index value which is previously calculated using a simulator or a test is specifically referred to as the reference refrigerant quantity index value 131. Of the refrigerant quantity index value, another index value which is calculated based on an operating state data acquired from the air conditioning system 200 (a measured value) is specifically referred to as a measured refrigerant quantity index value.

The refrigerant circulation flow rate is calculated using at least one of (A1) to (A13) as follows.

(A1) a rotation rate of the compressor 232

(A2) a refrigerant discharge pressure of the compressor 232 (a measurement value by the pressure sensor P1)

(A3) a refrigerant suction pressure of the compressor 232 (a measurement value by the pressure sensor P2)

(A4) a refrigerant discharge temperature of the compressor 232 (a measurement value by the thermistor T1)

(A5) a refrigerant suction temperature of the compressor 232

(A6) an outside air temperature at an entry of the condenser 211 (a measurement value by the thermistor T5)

(A7) an outside air temperature at an exit of the condenser 211

(A8) a refrigerant temperature at the entry of the condenser 211

(A9) a heat exchange temperature of the condenser 211 (a measurement value by the thermistor T2)

(A10) an air flow rate of the evaporator fan 222

(A11) an air flow rate of the condenser fan 212

(A12) an outside air temperature at the entry of the evaporator 221 (a measurement value by the thermistor T3)

(A13) an outside air temperature at the exit of the evaporator 221 (a measurement value by the thermistor T4)

Each of (A1) to (A13) is operating state data. Note that each of the refrigerant suction temperature of the compressor 232, the outside air temperature at the exit of the condenser 211, the refrigerant temperature at the entry of the condenser 211, the air flow rate the evaporator fan 222, and the air flow rate of the condenser fan 212 is a data acquired by a sensor not illustrated.

Next is described a state of a refrigerant at the exit of the condenser 211. In the air conditioning system 200, generally, a refrigerant undergoes a change in phase from a gas phase to a gas-liquid two-phase, and, finally, a liquid phase by being subjected to heat exchange with the surroundings by the condenser 211. When the refrigerant is insufficient due to leakage or the like, the refrigerant may have a reduced or no region of the liquid phase at the exit of the condenser 211. Thus, a value relevant to a change in phase from a two-phase region to a liquid region, or to a dimension of the liquid region is used to represent the refrigerant state at the exit of the condenser 211. More specifically, at least one of the following (B1) to (B5) is used as a data indicating a refrigerant state at the exit of the condenser 211.

(B1) an opening of the expansion valve 231

(B2) a refrigerant discharge pressure of the compressor 232 (a measurement value by the pressure sensor P1)

(B3) a refrigerant suction pressure of the compressor 232 (a measurement value by the pressure sensor P2)

(B4) an outside air temperature at the exit of the condenser 211

(B5) a heat exchange temperature of the condenser 211 (a measurement value by the thermistor T2)

When a refrigerant cycle of the air conditioning system 200 is equipped with a supercooler (not illustrated), at least one of (B1) to (B8) can be used as a data indicating a refrigerant state.

(B6) a temperature at an exit of the supercooler (B7) an opening of a supercool expansion valve (B8) a degree of supercooling Each of (B1) to (B8) is operating state data. Note that each of the outside air temperature at the exit of the condenser 211, the temperature at the exit of the supercooler, and the opening of the supercool expansion valve is a data acquired by a sensor not illustrated.

When, for example, the opening of the expansion valve 231 is used as a data representing a refrigerant state at the exit of the condenser 211, if a refrigerant quantity which is an amount of refrigerant charged in a refrigerant cycle becomes deficient (if refrigerant leakage has occurred), a refrigerant quantity index value becomes larger. When the degree of supercooling is used as a data representing the refrigerant state at the exit of the condenser 211, if a refrigerant quantity becomes deficient (if refrigerant leakage has occurred), the refrigerant quantity index value becomes smaller. It is assumed in this embodiment that a refrigerant quantity index value becomes larger, when a refrigerant quantity becomes deficient. Another refrigerant quantity index value may be used, however, which becomes smaller when a refrigerant quantity becomes deficient.

(Operating Condition)

Next is described an operating condition which is made to correspond to a refrigerant quantity index value.

Generally, a heat pump apparatus including the air conditioning system 200 has different operating points when an operating condition thereof varies. As a result, a data acquired and a refrigerant quantity index value calculated from the acquired data are also changed. It is therefore important to make a comparison using equivalent operating conditions so as to appropriately evaluate a refrigerant quantity index value. An operating condition described in the first embodiment is defined as an external factor causing a change in a refrigerant quantity index value, though, in reality, there is no change in a refrigerant quantity in the air conditioning system 200. As the operating condition, more specifically, at least one of the following (C1) to (C9) is used.

(C1) an outside air temperature at the entry of the condenser 211 (a measurement value by the thermistor T5: an outside air temperature)

(C2) a rotation rate of the compressor 232

(C3) the number of units of the evaporators 221 in operation (that is, the number of units of the indoor units 220)

(C4) a set temperature of the evaporator 221 (a set temperature of the indoor unit 220)

(C5) an air flow rate of the evaporator fan 222

(C6) an air flow rate of the condenser fan 212

(C7) an outside air temperature at the entry of the evaporator 221 (a measurement value by the thermistor T3: an outside air temperature)

(C8) an outside air temperature at the exit of the evaporator 221 (a measurement value by the thermistor T4: an outside air temperature)

(C9) a refrigerant discharge pressure of the compressor 232 (a measurement value by the pressure sensor P1: a pressure on a high-pressure side of a refrigeration cycle)

Each of (C1) to (C9) is operating state data. In addition to (C1) □ (C9), a cooling/heating capacity equivalent may also be used as the operating state data, which is obtained by multiplying a difference between respective temperatures at an entry and an exit of an evaporator when cooling, by an air flow rate of an indoor fan. Note that it is assumed in the first embodiment that each of the refrigerant circulation flow rate, the refrigerant state at the exit of the condenser 211, and the operating condition described above can be estimated using a sensor installed for controlling the air conditioning system 200 as illustrated in FIG. 1. Each of the refrigerant circulation flow rate and the refrigerant state at the exit of the condenser 211 is not, however, limited to that and may be acquired using another sensor installed such as a temperature sensor, a pressure sensor, a flowmeter, and a sight glass, when needed.

(Reference Refrigerant Quantity Index Value 131)

Next is described the reference refrigerant quantity index value 131 used when the refrigerant quantity diagnosis server 100 according to the first embodiment determines a refrigerant quantity. FIG. 1 and FIG. 3 are also referred to herein where appropriate.

The reference refrigerant quantity index value 131 stored in the auxiliary storage 130 is previously calculated with respect to an assumable operating condition of the air conditioning system 200 by means of simulation using a simulator or the like. That is, the reference refrigerant quantity index value 131 stored in the auxiliary storage 130: is previously calculated with respect to a prescribed operating condition value of an operating condition; and is made to correspond thereto, by means of simulation. This means that the reference refrigerant quantity index value 131 is made to correspond to each of operating condition values of an operating condition. That is, the reference refrigerant quantity index value 131 is associated with each of discrete or continuous operating condition values in a prescribed range of interest of each of operating conditions.

When the refrigerant quantity diagnosis server 100 diagnoses a plurality of the air conditioning systems 200, the air conditioning systems 200 may share the same reference refrigerant quantity index value 131 or may calculate the respective reference refrigerant quantity index values 131. The reference refrigerant quantity index value 131 is not limited to a calculated value obtained by simulation or the like. The reference refrigerant quantity index value 131: may be calculated by, for example, calculating a refrigerant quantity index value based on an operating state data obtained from a result of calculation with tentatively varying an operating condition value of the air conditioning system 200 in a normal period (a test result of the air conditioning system 200), to thereby obtain the calculated refrigerant quantity index value as the reference refrigerant quantity index value 131; and may be stored in the auxiliary storage 130. The refrigerant quantity index value herein includes the reference refrigerant quantity index value 131 and a measured refrigerant quantity index value. The reference refrigerant quantity index value 131 may be calculated based on an operating state data collected collected via, for example, the network N (see FIG. 1) from a plurality of the air conditioning systems 200 (see FIG. 1) including the air conditioning system 200 which is targeted for diagnosis. In this case, a plurality of the air conditioning systems 200 from each of which actual operating data is collected may be of the same model type or of model type different from each other.

In the case as described above, a plurality of the reference refrigerant quantity index values 131 calculated in different manners may be used based on the operating state data collected by a simulation or a test, or via the network N.

(Weighting Coefficient 132)

Description below is made with reference to FIG. 1 and FIG. 3 where appropriate.

The weighting coefficient 132 corresponding to each of operating conditions is adjusted such that, an operating condition having a higher air-conditioning load in the air conditioning system 200 has a higher value than that having a lower air-conditioning load. The weighting coefficient 132 may be set for each operating condition, such that, for example, the weighting coefficient 132 of an operating condition is larger than that of another operating condition. Or, with respect to the same operating condition, when an operating condition value is smaller, the weighting coefficient 132 may be made smaller; and, when larger, larger. Note that the operating condition having a higher air-conditioning load includes, in addition to an operating condition having a large cooling capacity output, an operating condition having, for example, a high cooling condensation pressure. The weighting coefficient 132 is not necessarily a positive value for all operating conditions. For example, when an operating condition or an operating condition value is previously determined not to be stable, the weighting coefficient 132 thereof may be set to 0 (zero).

(Relationship Between Refrigerant Quantity Index Value and Operating Condition, Normal Time Ratio, and Determination Time Ratio)

Figure 4:
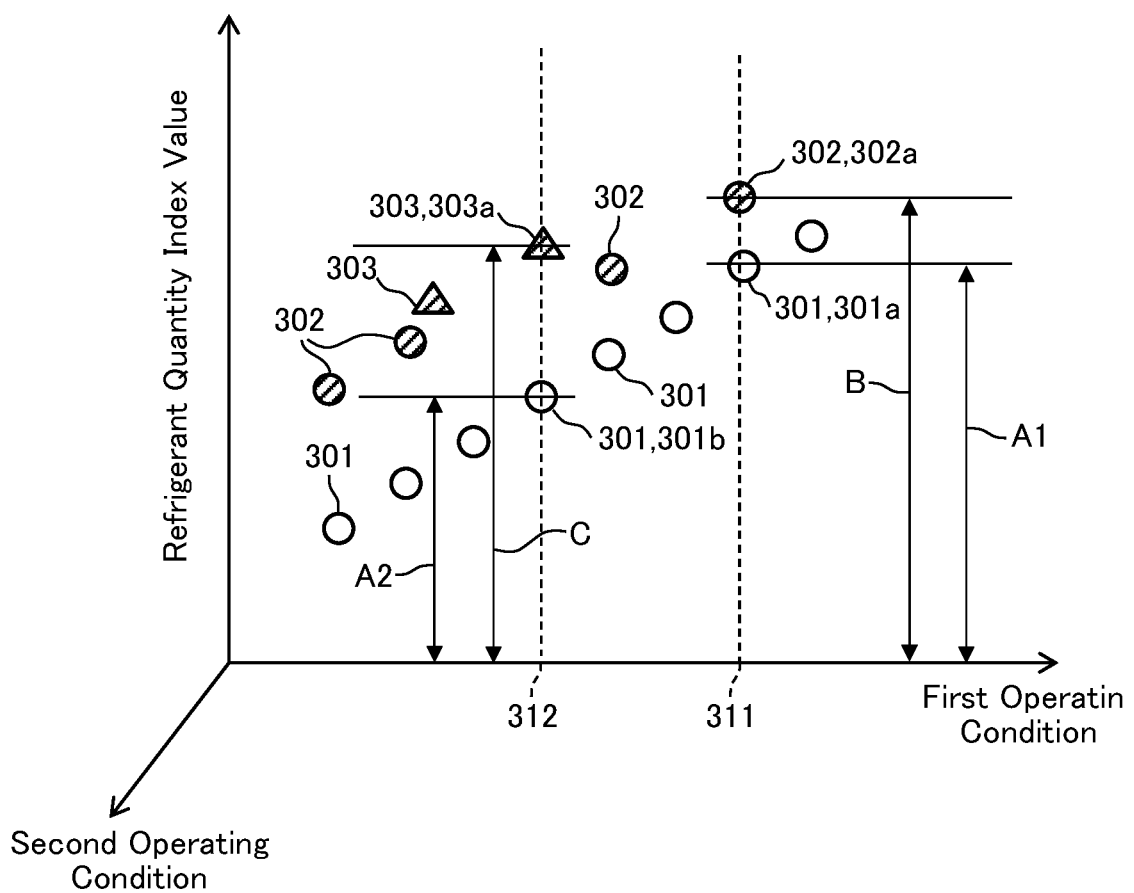
FIG. 4 is a diagram illustrating a relationship between a refrigerant quantity index value and an operating condition, a normal time ratio, and a determination time ratio according to the first embodiment.

FIG. 4 is a diagram illustrating a relationship between a refrigerant quantity index value and an operating condition, a normal time ratio, and a determination time ratio. FIG. 1 to FIG. 3 are also referred to herein where appropriate.

In FIG. 4, a plotted point 301 represented by an open circle is the reference refrigerant quantity index value 131, which is stored in the auxiliary storage 130. A plotted point 302 represented by a hatched circle is a measured refrigerant quantity index value in a normal period, which is calculated by the calculation part 112. And, a plotted point 303 represented by a hatched triangle is a measured refrigerant quantity index value calculated in a determination period.

FIG. 4 illustrates an example in which there are two operating conditions (a first operating condition and a second operating condition) as operating conditions influencing the refrigerant quantity index values. That is, each of the refrigerant quantity index values are made to correspond to respective values under the first operating condition and the second operating condition. Note that in FIG. 4, the ordinate denotes the refrigerant quantity index value.

The number of the operating conditions is not limited to two and may be one or more than two. Note that the example illustrated in FIG. 4 gives the refrigerant quantity index values under a fixed second operating condition. That is, each of the refrigerant quantity index values is plotted on a plane formed by the first operating condition and the refrigerant quantity index value.

The auxiliary storage 130 in the refrigerant quantity diagnosis server 100 according to the first embodiment previously stores therein the aforementioned reference refrigerant quantity index value 131 for each of operating condition values which are assumable in the air conditioning system 200. As described above, the reference refrigerant quantity index value 131 is calculated for each of operating condition values of an operating condition, using, for example, a simulation and/or a test. In the example illustrated in FIG. 4, the reference refrigerant quantity index value 131 is calculated for each of the first and the second operating condition values by means of a simulation, a test, or the like; and the calculated reference refrigerant quantity index value 131 is stored in the auxiliary storage 130.

It is not, however, required that a measured refrigerant quantity index value for each in the normal period and in the determination period be made to correspond to an assumable operating condition value in the air conditioning system 200. That is, there is no need to acquire a measured refrigerant quantity index value with respect to all of possible operating condition values. Respective operating condition values with respect to the measured refrigerant quantity index values in the normal period and in the determination period may or may not be different from each other.

In calculating a measured refrigerant quantity index value in the normal period, a plurality of measured refrigerant quantity index value are calculated in accordance with the number of operating state data acquired in the normal period. As described above, it is assumed in this embodiment that the air conditioning system 200 operates normally for a prescribed period of time from when the system 200 is started and that the prescribed period of time from the start thereof is referred to as a normal period.

The ratio calculation part 113 calculates a normal time ratio in the normal period (a refrigerant quantity index evaluation value or a first refrigerant quantity index evaluation value), based on the reference refrigerant quantity index value 131 and the measured refrigerant quantity index value with respect to the same (corresponding) operating condition value. More specifically, the ratio calculation part 113 calculates a ratio of the measured refrigerant quantity index value to the reference refrigerant quantity index value 131, each having the same operating condition. For example, the ratio calculation part 113 selects a measured refrigerant quantity index value in the normal period. Let us assume a case where a measured refrigerant quantity index value represented by a plotted point 302*a* is selected. The ratio calculation part 113 then acquires an operating condition value corresponding to the selected measured refrigerant quantity index value. In the example illustrated in FIG. 4, an operating condition value represented by reference numeral 311 is acquired. The ratio calculation part 113 acquires the reference refrigerant quantity index value 131 corresponding to the acquired operating condition value. In the example of FIG. 4, the reference refrigerant quantity index value 131 (a plotted point 301*a*) corresponding to the operating condition value indicated by reference numeral 311 is acquired. The ratio calculation part 113 calculates a ratio of a measured refrigerant quantity index value having the same operating condition value, to the acquired reference refrigerant quantity index value 131. In the example of FIG. 4, a ratio "B/A1" of the measured refrigerant quantity index value indicated by the plotted point 302*a* (a value "B"), to the reference refrigerant quantity index value 131 indicated by the plotted point 301*a* (a value "A1") is calculated. The ratio as calculated above is referred to as a normal time ratio.

The ratio calculation part 113 also calculates a ratio of a measured refrigerant quantity index value other than the plotted point 302*a* in the normal period, to the appropriate reference refrigerant quantity index value 131 having a measured refrigerant quantity index value and an operating condition corresponding to those of the measured refrigerant quantity index value of interest. As described above, the ratio calculation part 113 calculates a normal time ratio of each of the measured refrigerant quantity index values in the normal period.

A measured refrigerant quantity index value in a normal period typically has a value of or near the reference refrigerant quantity index value 131. Thus, a normal time ratio in general has a value of or near 1 (one). Depending on an environment in which the air conditioning system 200 is provided, a difference of an amount of a refrigerant charge during construction, or an individual difference, however, the measured refrigerant quantity index value in the normal period has in some cases a value different from the reference refrigerant quantity index value 131 within a range free of possible problems. In those case, the normal time ratio may not have a value of or near 1 (one).

Similarly to the described above, the ratio calculation part 113 calculates a determination time ratio in the determination period, based on the reference refrigerant quantity index value 131 having the same (corresponding) operating condition, and a measured refrigerant quantity index value. A plurality of the measured refrigerant quantity index values in the determination period (such as the plotted point 303) are calculated, based on which the determination time ratio is calculated using a procedure similar to that in the normal period.

For example, the ratio calculation part 113 selects a measured refrigerant quantity index value in the determination period. Let us assume a case where a measured refrigerant quantity index value represented by a plotted point 303a is selected. The ratio calculation part 113 then acquires an operating condition value corresponding to the selected measured refrigerant quantity index value. In the example illustrated in FIG. 4, an operating condition value indicated by reference numeral 312 is acquired. The ratio calculation part 113 acquires the reference refrigerant quantity index value 131 corresponding to the acquired operating condition value. In the example of FIG. 4, the reference refrigerant quantity index value 131 (a plotted point 301b) corresponding to the operating condition value indicated by reference numeral 312 is acquired. The ratio calculation part 113 calculates a ratio of the measured refrigerant quantity index value having the same operating condition value, to the acquired reference refrigerant quantity index value 131. In the example of FIG. 4, a ratio "C/A2" of the measured refrigerant quantity index value indicated by the plotted point 303a (a value "C"), to the reference refrigerant quantity index value 131 indicated by the plotted point 301b (a value "A2") is calculated.

The ratio calculation part 113 also calculates a ratio of a measured refrigerant quantity index value other than the plotted point 303a in the determination period, to the appropriate reference refrigerant quantity index value 131 having a measured refrigerant quantity index value and an operating condition corresponding to those of the measured refrigerant quantity index value of interest. The ratio in the determination period calculated as described above of the measured refrigerant quantity index value to the reference refrigerant quantity index value 131 is referred to as a determination time ratio (a refrigerant quantity index evaluation value or a second refrigerant quantity index evaluation value).

Note that in the first embodiment, a ratio of a measured refrigerant quantity index value to the reference refrigerant quantity index value 131 is calculated, as described as the normal time ratio and the determination time ratio. The present invention is not, however, limited to this. A difference value between a measured refrigerant quantity index value and the reference refrigerant quantity index value 131 may be used in place of the normal time ratio and the determination time ratio.

Figure 5:
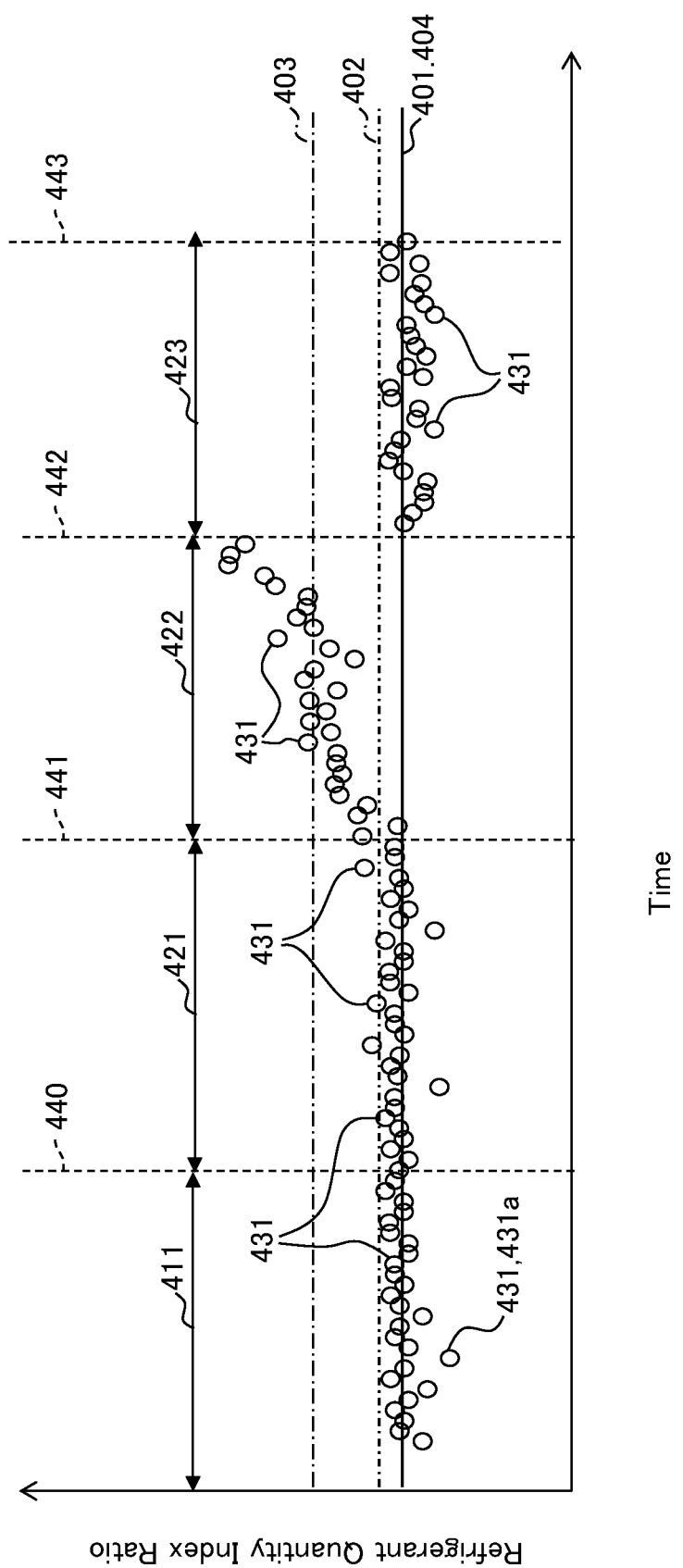
FIG. 5 is a diagram for explaining a refrigerant quantity determination according to the first embodiment.

All of the calculated normal time ratios and determination time ratios each in association with an appropriate operating condition value: are stored in the main storage 121; and are subjected to a refrigerant quantity determination illustrated in FIG. 5.

(Refrigerant Quantity Determination)

FIG. 5 is a diagram for explaining a refrigerant quantity determination according to this embodiment. FIG. 2 and FIG. 3 are also referred to herein where appropriate.

In FIG. 5, the abscissa denotes a time and the ordinate denotes a refrigerant quantity index ratio which is a rate of a refrigerant quantity index value. The refrigerant quantity index ratio includes a normal time ratio and a determination time ratio as described in FIG. 4.

In the refrigerant quantity determination, information on a normal time ratio calculated in the normal period is compared with information on a determination time ratio calculated in the determination period, to thereby diagnose a refrigerant quantity in the air conditioning system 200. The refrigerant quantity determination is described next with reference to FIG. 5.

In FIG. 5, normal time ratios and determination time ratios are plotted in chronological order.

Operating state data in a normal period 411 is collected. As described above, the normal period 411 is a certain period of time from immediately after an operation of the air conditioning system 200 to be diagnosed is started (or installed). Based on the collected operating state data, a measured refrigerant quantity index value is calculated. Operating state data is further collected for respective determination periods 421 to 423, each of which is a period of time after the normal period 411. Based on the collected operating state data, a measured refrigerant quantity index value is calculated. As illustrated in FIG. 5, the determination periods 421 to 423 are divided at prescribed time intervals.

A plurality of normal time ratios are calculated in the normal period 411. Similarly, a plurality of determination time ratios are calculated in each of the determination periods 421 to 423. In FIG. 5, each of plotted points 431 in the normal period 411 is a normal time ratio. Similarly, each of plotted points 431 in the determination periods 421 to 423 is a determination time ratio.

Note that data in FIG. 5 is explained for each of the four periods, namely, the normal period 411, the determination period 421, the determination period 422, and the determination period 423. Note that same data may be, however, contained in the normal period 411, the determination period 421, the determination period 422, and the determination period 423. That is, the normal period 411 and the determination periods 421 to 423 may have a duplicate period of time. Each of the normal period 411 and the determination periods 421 to 423 may not be continuous.

At a point of time when each of the determination period 421 to 423 terminates (at times 441 to 443, respectively), the refrigerant quantity determination part 114 calculates a determination time ratio and performs a refrigerant quantity determination processing. Note that at a point of time when the normal period 411 terminates (a time 440), a normal time ratio is calculated. In FIG. 5, the plotted points 431 each as a normal time ratio or a determination time ratio are obtained by replotting the normal time ratios and the determination time ratios calculated at each of times 440 to 443, with respect to a time at which an operating state data from which each of the normal time ratios and the determination time ratios is calculated is acquired.

A refrigerant quantity determination processing performed at the time 441 is herein explained as an example. At the time 441, whether or not there is a change in a refrigerant quantity during the determination period 421 is determined.

The refrigerant quantity determination part 114 extracts the weighting coefficient 132 for each of operating conditions corresponding to respective normal time ratios in the normal period 411. The refrigerant quantity determination part 114 multiplies
each of the normal time ratios in the normal period 411 by the weighting coefficient 132 corresponding thereto, to thereby calculate a weighted average as a normal time ratio average value (a first average value:information on a first refrigerant quantity index evaluation value). In FIG. 5, a solid line 401 represents the normal time ratio average value. It is demonstrated that some normal time ratios are downward away from the normal time ratio average value (for example, a plotted point 431*a*). An operating condition of such a normal time ratio away from the normal time ratio average value has the weighting coefficient 132 set lower than that of the other normal time ratio(s). Thus, the weighted average can reduce an influence of the normal time ratio away from the normal time ratio average value including the plotted point 431*a*, on the normal time ratio average value. The refrigerant quantity determination part 114 stores the calculated normal time ratio average value in the main storage 121.

In the determination period 421, similarly to the normal period 411, the refrigerant quantity determination part 114 extracts the weighting coefficient 132 of each of the determination time ratios from the auxiliary storage 130; and thereby calculates the weighting coefficient 132 thereof. The refrigerant quantity determination part 114 thereby calculates a determination time ratio average value (a second average value:information on a second refrigerant quantity index evaluation value) in the determination period 421 indicated by a chain line 402.

The refrigerant quantity determination part 114 compares the calculated determination time ratio average value with the calculated normal time ratio average value, to thereby determine a refrigerant quantity. More specifically, the refrigerant quantity determination part 114 compares an absolute value of a difference between the determination time ratio average value and the normal time ratio average value, with a prescribed threshold.

At the time 442, the refrigerant quantity determination part 114 calculates a determination time ratio average value in the determination period 422 (indicated by another chain line 403), similarly to that in the determination period 421. The refrigerant quantity determination part 114 compares an absolute value of a difference between the calculated determination time ratio average value and the calculated normal time ratio average value, with a prescribed threshold. Similarly, at a time 443, the refrigerant quantity determination part 114 calculates a determination time ratio average value in the determination period 423 (indicated by a solid line 404). The refrigerant quantity determination part 114 compares an absolute value of a difference between the calculated determination time ratio average value and the calculated normal time ratio average value, with a prescribed threshold.

When the absolute value of the difference between the determination time ratio average value and the normal time ratio average value is larger than the prescribed threshold, the refrigerant quantity determination part 114 determines that there is a change in a refrigerant quantity in the determination periods 421 to 423 of interest, compared to that in the normal period 411. Meanwhile, when the absolute value of the difference between the determination time ratio average value and the normal time ratio average value is equal to or smaller than the prescribed threshold, the refrigerant quantity determination part 114 determines that there is no change in the refrigerant quantity in the determination periods 421 to 423 of interest, compared to that in the normal period 411.

In the example illustrated in FIG. 5, in the determination period 422, a difference between the determination time ratio average value indicated by the chain line 403 and the normal time ratio average value indicated by the solid line 401 is larger than a prescribed threshold. The refrigerant quantity determination part 114 thus determines that there is a change in a refrigerant quantity in the determination period 422, compared to that in the normal period 411. The terms used herein "there is a change in a refrigerant quantity" means that refrigerant leakage has occurred. When it is determined that there is a change in a refrigerant quantity, a user inspects the refrigerant quantity.

In the example of FIG. 5, a difference between the determination time ratio average value in the determination period 421 indicated by the chain line 402 and the normal time ratio average value in the normal period 411 indicated by the solid line 401 is equal to or smaller than the prescribed threshold. The refrigerant quantity determination part 114 thus determines that there is no change in the refrigerant quantity in the determination period 421, compared to that in the normal period 411.

Similarly, in the example of FIG. 5, a difference between the determination time ratio average value in the determination period 423 indicated by the solid line 404 and the normal time ratio average value in the normal period 411 indicated by the solid line 401 is equal to or smaller than the prescribed threshold. The refrigerant quantity determination part 114 thus determines that there is no change in the refrigerant quantity in the determination period 423, compared to that in the normal period 411.

Note that, in the example of FIG. 5, because it is determined that there is a change in the refrigerant quantity (refrigerant leakage has occurred) in the determination period 422, refrigerant is additionally charged at a time when the determination period 422 terminates (at the time 442). In the determination period 423, the determination time ratio average value (solid line 404) is at almost the same level as the normal time ratio average value (the solid line 401).

As described above, the refrigerant quantity index value can be set such that the larger the refrigerant quantity, the larger the refrigerant quantity index value. In this case, chronological data of a normal time ratio average value and a determination time ratio average value is expressed as an inversion of FIG. 5.

[Processing of Calculating Normal Time Ratio in Normal Period]

Figure 6:
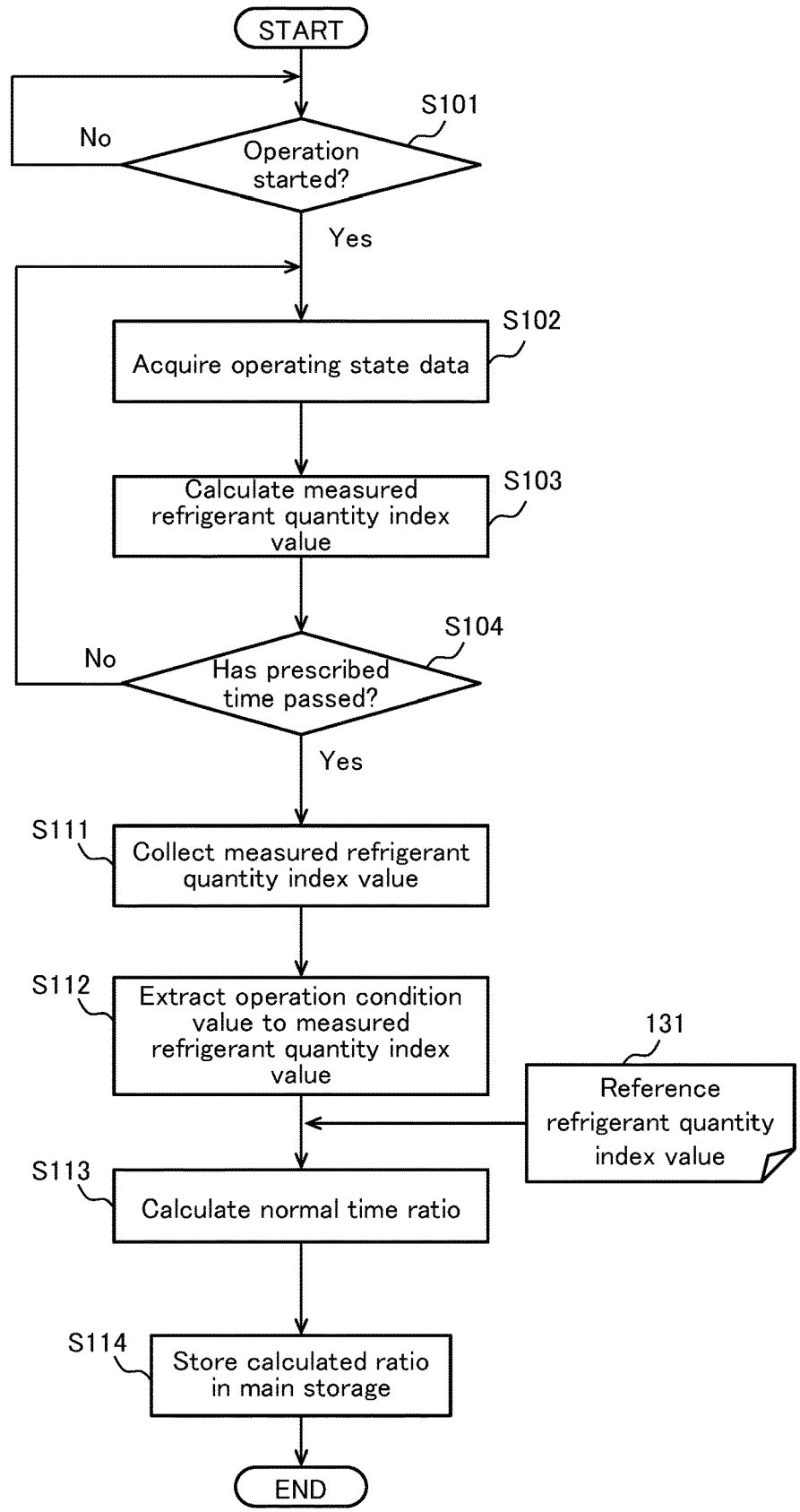
FIG. 6 is a flowchart illustrating steps of a processing in a normal period according to the first embodiment.

FIG. 6 is a flowchart illustrating steps of a processing performed in the normal period 411 (see FIG. 5). FIG. 1 to FIG. 3 are also referred to herein where appropriate.

At first, the data collection part 111 determines whether or not an operation of the air conditioning system 200 has started based on whether or not a power of the air conditioning system 200 is turned ON (S101).

When the operation is not determined to have started (S101→No), the data collection part 111 returns the processing to step S101.

When the operation is determined to have started (S101→Yes), the data collection part 111 acquires operating state data (S102). The operating state data is acquired at prescribed time intervals.

The calculation part 112 calculates a measured refrigerant quantity index value based on the acquired operating state data (S103).

The ratio calculation part 113 determines whether or not a prescribed time has passed from when the operation of the air conditioning system 200 is started in step S101 (S104).

As a result determined in step S104, when the prescribed time has not passed (S104→No), the ratio calculation part 113 returns the processing to step S102.

As a result determined in step S104, when the prescribed time has passed (S104→Yes), the ratio calculation part 113 collects all of the measured refrigerant quantity index values calculated in step S103 (S111).

The data collection part 111 extracts an operating condition value corresponding to each of the collected measured refrigerant quantity index values from the operating state data (S112).

The ratio calculation part 113:references the auxiliary storage 130; and acquires therefrom the reference refrigerant quantity index value 131 corresponding to the extracted operating condition value. The ratio calculation part 113 calculates a ratio of the measured refrigerant quantity index value collected in step S111, to the reference refrigerant quantity index value 131, to thereby calculate a normal time ratio (S113). Step S113 corresponds to the calculation of a normal time ratio ("B/A1") illustrated in FIG. 4.

The ratio calculation part 113 stores the calculated normal time ratio in the main storage 121 (S114). The refrigerant quantity diagnosis server 100 then terminates the processing.

In the processing illustrated in FIG. 6, all of the normal time ratios in the normal period are calculated together. Instead, a normal time ratio may be calculated each time a measured refrigerant quantity index value is calculated in step S103.

(Processing in Determination Period)

Figure 7A:
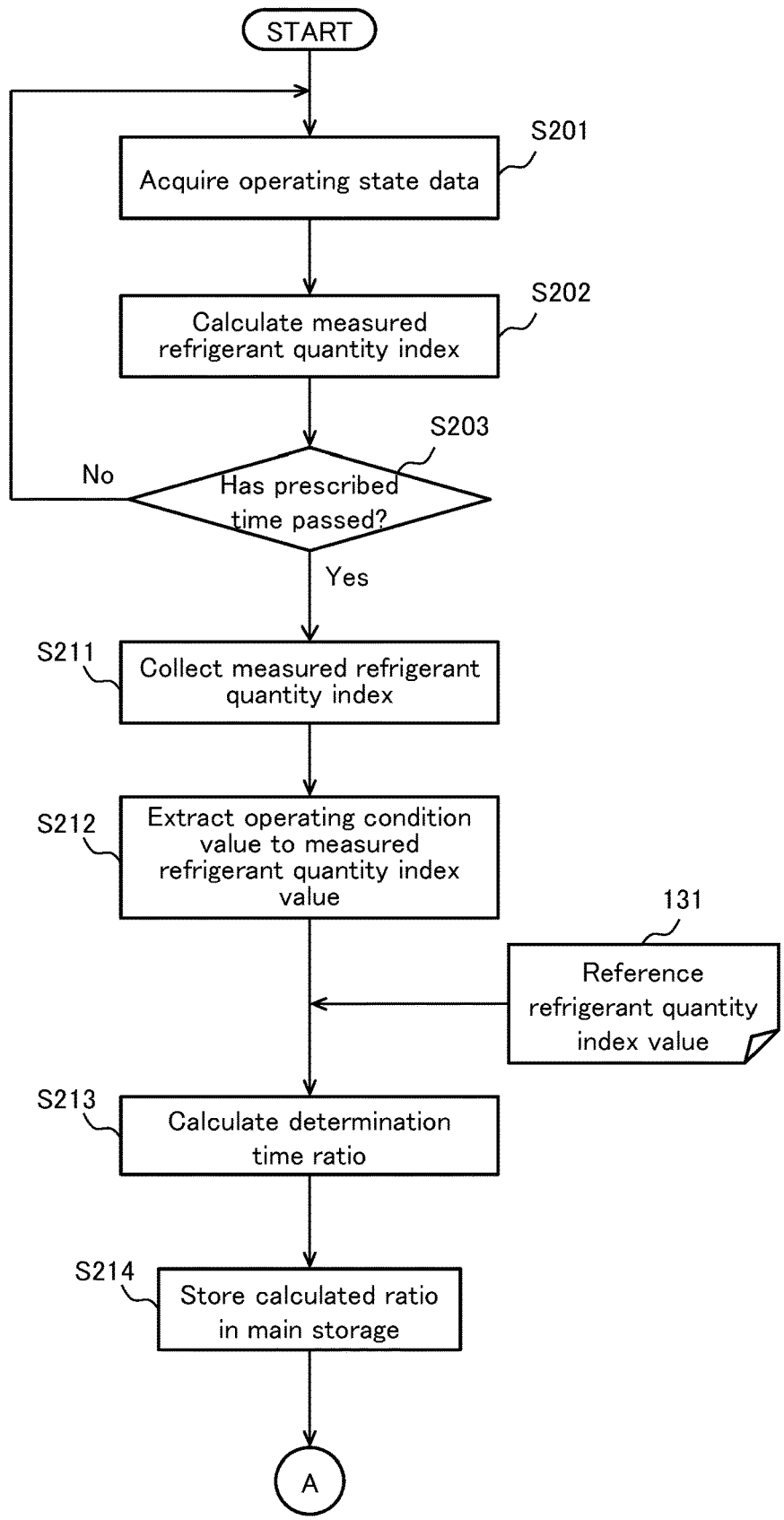
FIG. 7A is a flowchart (Part 1) illustrating steps of a processing in a determination period according to the first embodiment.
Figure 7B:
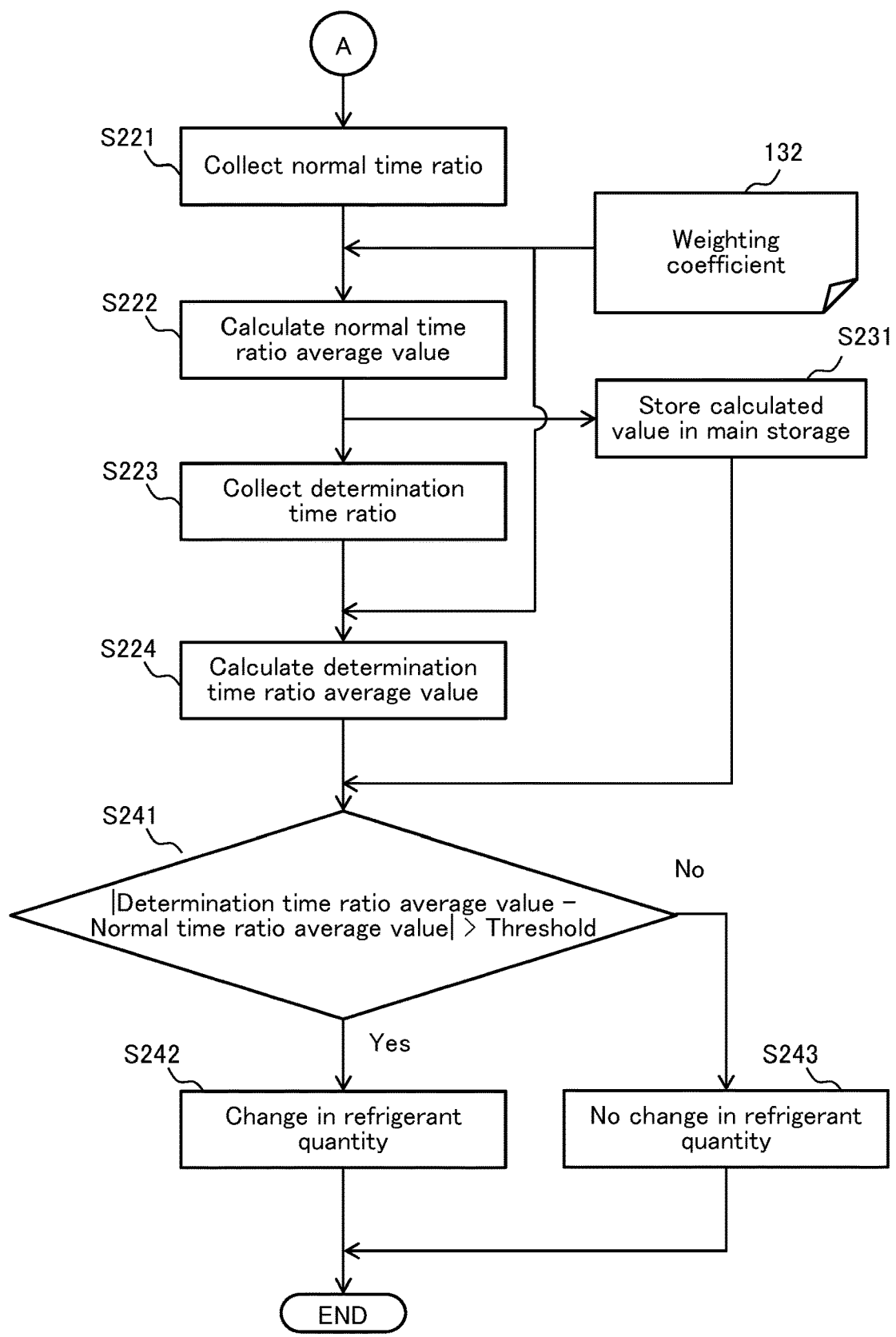
FIG. 7B is a flowchart (Part 2) illustrating steps of the processing in the determination period according to the first embodiment.

FIG. 7A and FIG. 7B are each a flowchart illustrating steps of a processing in the determination periods 421 to 423 (see FIG. 5). FIG. 1 to FIG. 3 are also referred to herein where appropriate.

When a determination period is started, the data collection part 111 acquires operating state data (S201). The operating state data is acquired at prescribed intervals.

The calculation part 112 calculates a measured refrigerant quantity index value based on the acquired operating state data (S202).

The ratio calculation part 113 determines whether or not a prescribed time has passed from when step S201 is performed (S203). The prescribed time herein may or may not be the same as the prescribed time in step S104 in FIG. 6.

As a result determined in step S203, when the prescribed time has not passed (S203→No), the ratio calculation part 113 returns the processing to step S201.

As a result determined in step S203, when the prescribed time has passed (S203→Yes), the ratio calculation part 113 collects all of the measured refrigerant quantity index values calculated in step S202 (S211).

The data collection part 111 extracts a value of an operating condition corresponding to each of the collected measured refrigerant quantity index values from the operating state data (S212).

The ratio calculation part 113:references the auxiliary storage 130; and acquires therefrom the reference refrigerant quantity index value 131 corresponding to the extracted operating condition value. The ratio calculation part 113 calculates a ratio of the measured refrigerant quantity index value calculated in step S211 to the reference refrigerant quantity index value 131, to thereby calculate a determination time ratio (S213). Step S213 corresponds to the calculation of a determination time ratio ("C/A2") in in FIG. 4.

The ratio calculation part 113 stores the calculated determination time ratio in the main storage 121 (S214).

Steps illustrated in FIG. 7B correspond to the steps explained in FIG. 5.

The refrigerant quantity determination part 114 collects all of the normal time ratios in the normal period stored in the main storage 121 (S221 in FIG. 7B).

The refrigerant quantity determination part 114: references the auxiliary storage 130; and extracts the weighting coefficient 132 corresponding to each of respective operating conditions of the collected normal time ratios. The refrigerant quantity determination part 114 calculates a weighted average of the normal time ratios collected in step S221, using the extracted weighting coefficients 132. The weighting coefficient 132 is determined based on an operating condition corresponding to a normal time ratio of interest. The refrigerant quantity determination part 114 thereby calculates a normal time ratio average value which is an average value of the normal time ratios (S222: a step of calculating a first refrigerant quantity index evaluation value).

The refrigerant quantity determination part 114 stores the calculated normal time ratio average value in the main storage 121 (S231).

The data collection part 111 collects all of the determination time ratios in the air conditioning system 200 calculated in steps S211 to S204 in FIG. 7A, from the main storage 121 (S223).

The refrigerant quantity determination part 114: references the auxiliary storage 130; and extracts therefrom the weighting coefficient 132 of an operating condition corresponding to each of the collected determination time ratios. The refrigerant quantity determination part 114 calculates an average value of the determination time ratios collected in step S223, using the extracted weighting coefficient 132. The weighting coefficient 132 is determined based on an operating condition corresponding to a determination time ratio of interest. The refrigerant quantity determination part 114 thereby calculates a determination time ratio average value which is an average value of the determination time ratios (S224: a step of calculating a second refrigerant quantity index evaluation value).

The ratio calculation part 113 determines whether or not a value of |Determination time ratio average value−Normal time ratio average value| is larger than a prescribed threshold (S241: a diagnosis step).

When the value of |Determination time ratio average value−Normal time ratio average value| is determined to be larger than the prescribed threshold (S241→Yes), the refrigerant quantity determination part 114 determines that there is a change in a refrigerant quantity (S242). The output processing part 115 outputs information showing that there is a change in the refrigerant quantity, as a result of the diagnosis, to the output device 123.

When the value of |Determination time ratio average value−Normal time ratio average value| is determined to be equal to or smaller than the prescribed threshold (S241→No), the refrigerant quantity determination part 114 determines that there is no change in the refrigerant quantity (S243). The output processing part 115 outputs information showing that there is no change in the refrigerant quantity, as a result of the diagnosis, to the output device 123.

In the processing illustrated in FIG. 7A, after the prescribed time has passed in step S203, the determination time ratios in the determination period are calculated all together. The determination time ratio may be, however, calculated one by one each time the measured refrigerant quantity index value is calculated in step S202.

In the first embodiment, an average value of the normal time ratios or the determination time ratios is calculated using the weighting coefficient 132 for each operating condition stored in the auxiliary storage 130. Depending on an operating state of the air conditioning system 200 to be diagnosed, however, a simple average of the normal time ratios or the determination time ratios may be calculated based on the number of pieces of data thereof, without using the above-described weighting coefficient 132. Alternatively, an average may be calculated, preferentially using a value of an operating condition estimated to have a high reliability of the acquired operating conditions. That is, the refrigerant quantity determination part 114 may: extract a value of an operating condition estimated to have a high reliability of the acquired operating conditions; and calculate an average of only the extracted operating condition values.

Once a refrigerant is charged in the air conditioning system 200, it is difficult to measure a quantity thereof after a prescribed time has passed from the charge thereof. Additionally, an operating condition of the air conditioning system 200 constantly changes. Thus, in diagnosing a refrigerant quantity using respective refrigerant quantity index values at different times, it is difficult to apply the same operating condition to the respective refrigerant quantity index values, which reduces accuracy of the diagnosis.

In the refrigerant quantity diagnosis server 100 according to the first embodiment, the auxiliary storage 130 previously stores therein the reference refrigerant quantity index value 131 corresponding to each of operating condition values. The refrigerant quantity diagnosis server 100 calculates a ratio of a measured refrigerant quantity index value to the reference refrigerant quantity index value 131 in a normal period (a normal time ratio). The refrigerant quantity diagnosis server 100 also calculates a ratio of a measured refrigerant quantity index value to the reference refrigerant quantity index value 131 in a determination period (a determination time ratio). The refrigerant quantity diagnosis server 100 compares the normal time ratio with the determination time ratio, to thereby diagnose a change in a refrigerant quantity (whether or not refrigerant leakage has occurred). The refrigerant quantity diagnosis server 100 according to the first embodiment can therefore perform a refrigerant quantity determination in a simple manner based on operating state data.

With the configuration described above, influence from an operating condition can be minimized. More specifically, influence from different operating points, setting and installation environment of the refrigerant quantity diagnosis server 100 to be diagnosed can be minimized. This makes it possible to perform a refrigerant quantity diagnosis with a high accuracy. Also, there is no need to create a model for diagnosis for each air conditioning system 200, because, as described above, the influence from different operating points, setting and installation environment of the refrigerant quantity diagnosis server 100 to be diagnosed can be minimized.

Additionally, determination of a refrigerant quantity using each of a measured refrigerant quantity index value, a normal time ratio, a determination time ratio, a normal time ratio, and a determination time ratio can be processed with a low calculation load. This can drastically reduce a processing load, compared to the technique disclosed in Patent Document 1. In particular, usage of such an average value as a normal time ratio average value and a determination time ratio average value can reduce a processing load of the determination.

A refrigerant quantity is herein determined using an actually measured refrigerant value which makes use of an operating condition equivalent to the previously-prepared reference refrigerant quantity index value 131 stored in the auxiliary storage 130. This can reduce a false detection in a case where a refrigerant quantity is determined using different operating conditions. As described above, the reference refrigerant quantity index value 131 is associated with a prescribed operating condition value of an operating condition of interest. Even when there is a plurality of the air conditioning systems 200 to be diagnosed which have respective structures different from each other, the reference refrigerant quantity index value 131 suitable for each of the air conditioning systems 200 is used. Thus, a plurality of the air conditioning systems 200 having respective structures different from each other can easily perform respective refrigerant quantity determinations according to this embodiment.

As described above, the reference refrigerant quantity index value 131 can be calculated based on operating state data collected from, for example, a simulator, a test, and an air conditioning system other than the air conditioning system 200 of interest. This makes it possible to, even when the number of sensors installed in the air conditioning system 200 to be diagnosed is small, calculate the reference refrigerant quantity index value 131 in accordance with the installed sensor or sensors making use of a simulator. This means that, even when the number of the installed sensors is small, leakage of refrigerant can be diagnosed without a need of disposing an additional sensor. An increase in production cost of the air conditioning system 200 can be thus controlled.

The weighting coefficient 132 stored in the auxiliary storage 130 is made to correspond to an appropriate operating condition. As described above, an operating condition having a high air-conditioning load is designed to have a large value of the weighting coefficient 132 in the air conditioning system 200. Thus, in determining a refrigerant quantity, a refrigerant quantity index value which has an operating condition suitable for a refrigerant quantity diagnosis can be easily reflected. In other words, a refrigerant quantity index value which does not have an operating condition suitable for a refrigerant quantity diagnosis is not easily reflected in determining a refrigerant quantity. This makes it possible to improve accuracy of the refrigerant quantity determination.

In this embodiment, the refrigerant quantity diagnosis server 100 is disposed separately from the air conditioning system 200. This makes it possible to control the air conditioning system 200 in a centralized manner. Especially, when a plurality of the air conditioning systems 200 are provided, it is advantageous to centrally control the air conditioning systems 200.

Next are described variations of the first embodiment.

As described above, a refrigerant quantity index value (the reference refrigerant quantity index value 131 or a measured refrigerant quantity index value) according to the first embodiment is set such that the less the refrigerant quantity (in short supply), the larger the value. This means that, when a value of "Determination time ratio average value−Normal time ratio average value" is positive, the refrigerant quantity has decreased. When a value of "Determination time ratio average value—Normal time ratio average value" is negative, the refrigerant quantity is larger than that in the normal period 411 (see FIG. 5). By applying the described above, when the value of "Determination time ratio average value−Normal time ratio average value" is positive, the output processing part 115 may output a data showing that the refrigerant runs short, from the output device 123. When the value of "Determination time ratio average value−Normal time ratio average value" is negative, the output processing part 115 may output a data showing that the refrigerant is sufficient, from the output device 123.

Alternatively, when "Yes" is determined in step S241 of FIG. 7B, the refrigerant quantity determination part 114 may determine a positive or a negative sign of the value of "Determination time ratio average value−Normal time ratio average value". When the value has a positive sign, the refrigerant quantity determination part 114 may determine that "a refrigerant quantity runs short". When the value has a negative sign, the refrigerant quantity determination part 114 may perform step S243 in FIG. 7B. Or, when the value of "Determination time ratio average value−Normal time ratio average value" is determined to be larger than a prescribed threshold which is a positive real number, in step S241 of FIG. 7B, the refrigerant quantity determination part 114 may determine "Yes".

Second Embodiment

A second embodiment of the present invention is described next with reference to FIG. 8.

Figure 8:
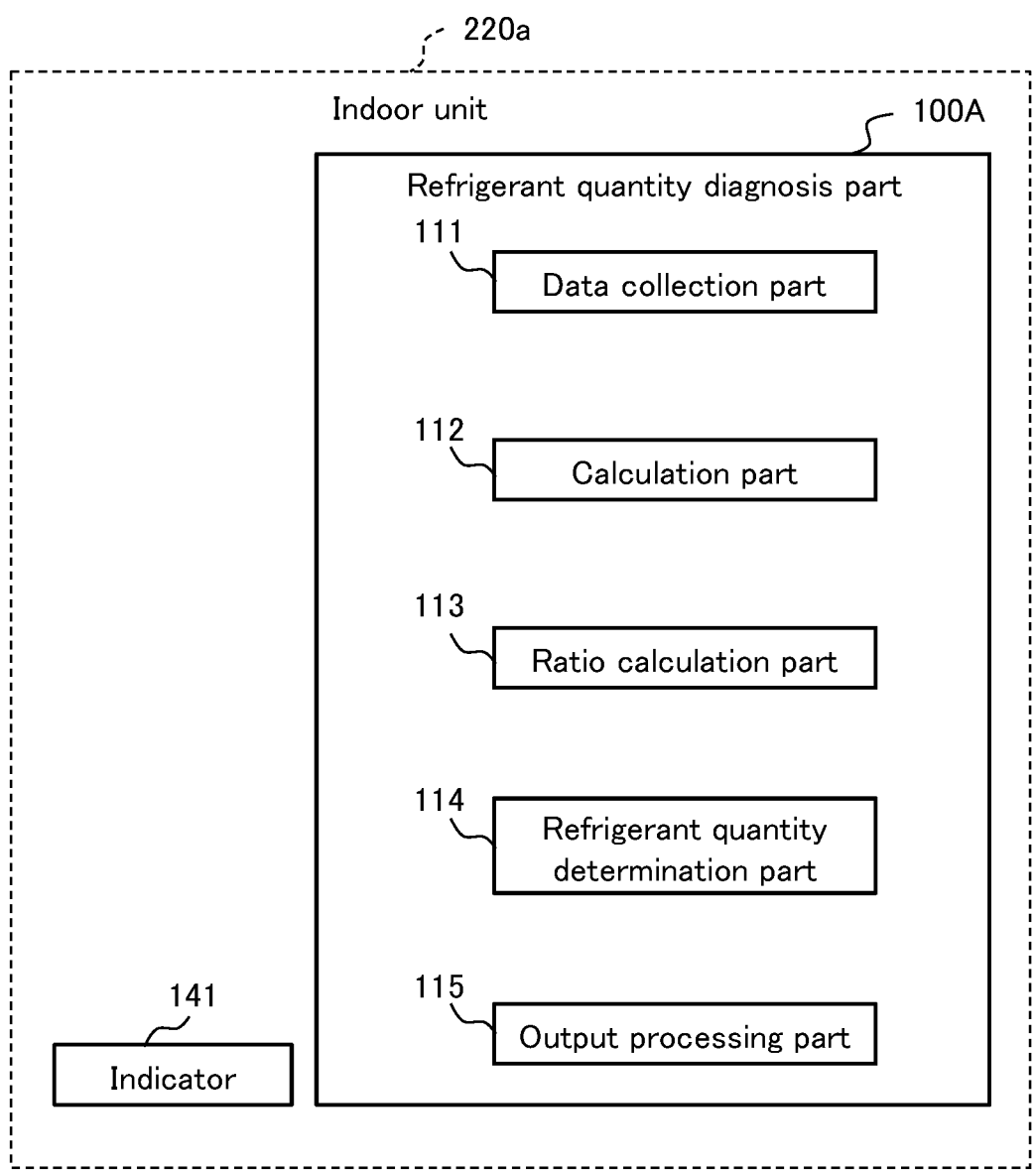
FIG. 8 is a diagram illustrating an example of a configuration of an indoor unit according to a second embodiment.

FIG. 8 is a diagram illustrating a configuration of an indoor unit 220a according to the second embodiment.

It is assumed herein that the indoor unit 220a illustrated in FIG. 8 is used in the air conditioning system 200 for household use. That is, the air conditioning system 200 to be diagnosed is placed in a house. A refrigerant quantity diagnosis part 100A is provided in a control board (not illustrated) of the indoor unit 220A. Note that in FIG. 8, the evaporator 221, the evaporator fan 222, and the expansion valve 223 (see FIG. 1) each included in the indoor unit 220a are not illustrated. The configuration of the air conditioning system 200 according to the second embodiment is the same as that illustrated in FIG. 1 except that the indoor unit 220a includes the refrigerant quantity diagnosis part 100A.

The refrigerant quantity diagnosis part 100A includes, similarly to the refrigerant quantity diagnosis server 100 illustrated in FIG. 2, the data collection part 111, the calculation part 112, the ratio calculation part 113, the refrigerant quantity determination part 114, and the output processing part 115. An indicator (an output part) 141 is a display device installed (included) in the indoor unit 220a. The indicator 141 is, for example, a LED (Light Emission Diode) lamp installed in the indoor unit 220a. The LED lamp may be simply referred to as a lamp hereinafter.

In this embodiment, how to diagnose refrigerant leakage is performed using a technique same as that according to the first embodiment. The technique has a low calculation load. Thus, the refrigerant quantity diagnosis part 100A illustrated in FIG. 8 works even without the configuration of communicating with the refrigerant quantity diagnosis server 100 via the network N as illustrated in FIG. 1. That is, the technique of diagnosing refrigerant leakage used in each of the first embodiment and the second embodiment has a low calculation load, which makes it possible to be provided in the indoor unit 220a.

More specifically, when the refrigerant quantity determination part 114 diagnoses and determines that refrigerant runs short, the output processing part 115 makes a result of the diagnosis displayed in the indicator 141 which is disposed in a body of the indoor unit 220a and indicates an operating state. When, for example, the refrigerant is determined to run short, the indicator 141 displays the diagnosed result by means of a specific color, the specific number of blinks, or the like, which is displayed differently from that when the refrigerant does not run short. As to the air conditioning system 200 for home use, a user is in most cases near the indoor unit 220a. The user is thus likely to notice the display in the indicator 141 installed in the indoor unit 220a, which can let the user know a refrigerant leakage.

The refrigerant system 1 according to the second embodiment does not use communications via the network N for diagnosis of a refrigerant quantity; and can be thus provided in any environment in which the air conditioning system 200 is operable. This can contribute to a wide spread of the air conditioning system 200 equipped with a refrigerant leakage detection function.

Note that the air conditioning system 200 according to the second embodiment is not limited to that illustrated in FIG. 8.

Figure 9:
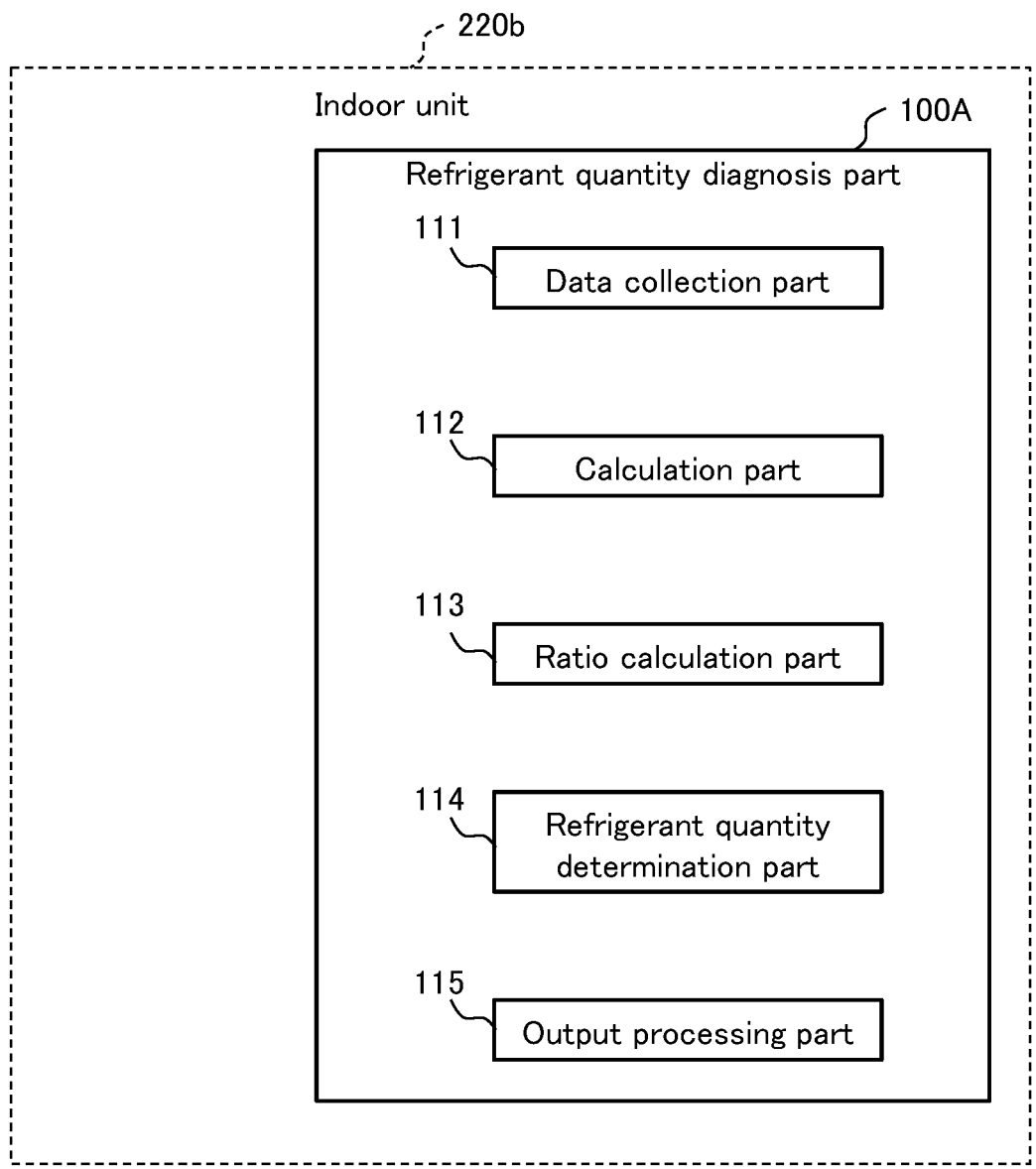
FIG. 9 is a diagram illustrating another example of a configuration of the indoor unit according to the second embodiment.
Figure 9:
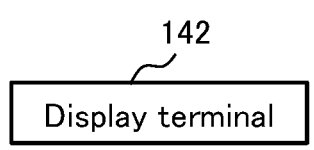

FIG. 9 is a diagram illustrating another example of an indoor unit 220b according to the second embodiment. In FIG. 9, the same reference numerals are given to the components similar to those illustrated in FIG. 8, and description thereof is omitted herefrom.

The indoor unit 220b illustrated in FIG. 9 includes, in place of the indicator 141, a display terminal 142 that is provided separately from the indoor unit 220b. The display terminal 142 is a remote controller, a smartphone, a tablet terminal, or the like, owned by a user.

The display terminal 142 has a communication function such as, for example, Bluetooth (registered trademark) and Wi-Fi. A result of diagnosis of a refrigerant quantity by the refrigerant quantity diagnosis part 100A may be transmitted to the user's display terminal 142 via communications such as Bluetooth (registered trademark) and Wi-Fi. The display terminal 142 may then display the result of the refrigerant quantity diagnosis.

Third Embodiment

A third embodiment of the present invention is described next with reference to FIG. 10 and FIG. 11.

Figure 10:
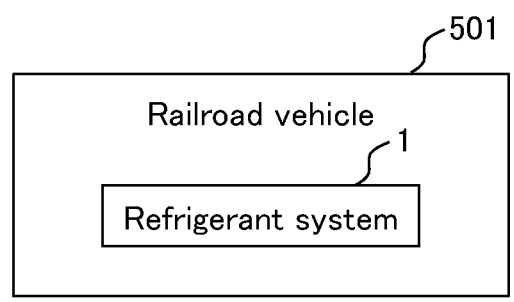
FIG. 10 is a diagram illustrating an example in which the refrigerant system according to the embodiment of the present invention is installed in a railroad vehicle.
Figure 11:
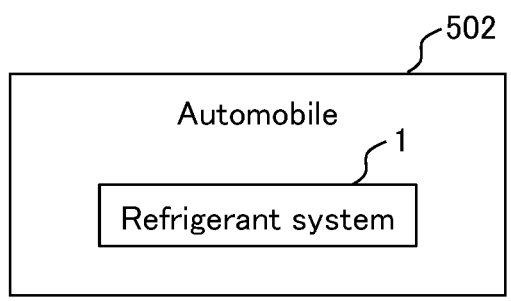
FIG. 11 is a diagram illustrating an example in which the refrigerant system according to the embodiment of the present invention is installed in an automobile.

FIG. 10 is a diagram illustrating an example in which the refrigerant system 1 according to this embodiment is installed in a railroad vehicle 501. FIG. 11 is a diagram illustrating an example in which the refrigerant system 1 according to this embodiment is installed in an automobile 502.

As illustrated in FIG. 10, the railroad vehicle 501 can be equipped with the refrigerant system 1 according to this embodiment. As illustrated in FIG. 11, the automobile 502 can be equipped with the refrigerant system 1 according to this embodiment. Note that the refrigerant system 1 in each of FIG. 10 and FIG. 11 is that described in the first or the second embodiments.

In the refrigerant system 1 according to this embodiment, the refrigerant quantity diagnosis server 100 may be a server installed on a cloud.

In this embodiment, the reference refrigerant quantity index value 131 and the weighting coefficient 132 are stored in the auxiliary storage 130. The reference refrigerant quantity index value 131 and the weighting coefficient 132 may be, however, acquired from outside via the network N or the like.

The present invention is carried out not only by the above-described embodiments but also by variations of many types. For example, the above-described embodiments are intended to be illustrative of the present invention in an easily understandable manner and the present invention is not limited to any of the embodiments including all of the components explained in the embodiments. Part of a configuration of an embodiment of the present invention may be substituted by or added to that of another. Part of a configuration of an embodiment thereof may be deleted.

A part or all of the configurations, the functions, the components 111 to 115, the auxiliary storage 130, or the like of the present invention described above can be realized by hardware by means of, for example, designing of integrated circuits. As illustrated in FIG. 3, the above-described configurations, functions, or the like can be embodied by software in which, for example, a processor interprets and executes a program which realizes the functions or the like. Data in a program, a table, a file, and the like for realizing such a function can be stored in a storage device including a HD (Hard Disk), a memory, and a SSD (Solid State Drive) or in a storage medium including an IC (Integrated Circuit) card, a SD (Secure Digital) card, and a DVD (Digital Versatile Disc).

In each of the embodiments, only a control line or an information line which is deemed necessary for explanation is illustrated, and not all of them which are necessary for a product are illustrated. In practice, almost all elements are deemed to be connected to each other.

DESCRIPTION OF REFERENCE NUMERALS 1 refrigerant system
100 refrigerant quantity diagnosis server (refrigerant quantity diagnosis device)
100A refrigerant quantity diagnosis part
111 data collection part
112 calculation part
113 ratio calculation part (evaluation value calculation part)
114 refrigerant quantity determination part (refrigerant quantity diagnosis part)
115 output processing part
121 main storage
122 arithmetic device
123 output device (output part)
124 input device
125 communication device
130 auxiliary storage
131 reference refrigerant quantity index value
132 weighting coefficient
141 indicator (output part)
142 display terminal
200 air conditioning system
210 exterior unit
211 condenser
212 condenser fan
220 indoor unit
221 evaporator
222 evaporator fan
223 expansion valve
231 expansion valve
232 compressor
233 four-way valve
301 plotted point (reference refrigerant quantity index value)
301a plotted point (reference refrigerant quantity index value)
301b plotted point (reference refrigerant quantity index value)
302 plotted point (measured refrigerant quantity index value in normal period)
302a plotted point (measured refrigerant quantity index value in normal period)
303 plotted point (determination period □ measured refrigerant quantity index value)
303a plotted point (determination period □ measured refrigerant quantity index value)
311 reference numeral
312 reference numeral
401 solid line (information on a first refrigerant quantity index evaluation value)
402 chain line (information on a second refrigerant quantity index evaluation value)
403 chain line (information on a second refrigerant quantity index evaluation value)
404 solid line (information on a second refrigerant quantity index evaluation value)
411 normal period (first period)
421 determination period (second period)
422 determination period (second period)
423 determination period (second period)
431 plotted point (refrigerant quantity index evaluation value, a first refrigerant quantity index evaluation value, a second refrigerant quantity evaluation value)
441 time
442 time
443 time
501 railroad vehicle
502 automobile
N network
P1 pressure sensor
P2 pressure sensor
T1 thermistor
T2 thermistor
T3 thermistor
T4 thermistor
T5 thermistor
S222 Calculate normal time ratio average value (First refrigerant quantity index evaluation value calculation step)
S224 Calculate determination time ratio average value (Second refrigerant quantity index evaluation value calculation step)
S241 |Determination time ratio average value−Normal time ratio average value|>Threshold (Diagnosis step)

The invention claimed is:

1. A refrigerant quantity diagnosis device for an air conditioning system, comprising:
a data collection part configured to acquire operating state data on the air conditioning system;
an evaluation value calculation part configured to calculate a refrigerant quantity index evaluation value that is a ratio of (i) a measured refrigerant quantity index value which is an index value of a quantity of a refrigerant in the air conditioning system and is calculated based on the acquired operating state data, to (ii) a reference refrigerant quantity index value which is a previously-calculated index value of the refrigerant quantity in the air conditioning system, or a difference value between (i) the measured refrigerant quantity index value and (ii) the reference refrigerant quantity index value; and a refrigerant quantity diagnosis part configured to diagnose the refrigerant quantity in the air conditioning system, based on the refrigerant quantity index evaluation value, wherein the reference refrigerant quantity index value is associated with at least one operating condition of the air conditioning system and is also associated with a prescribed value of the associated operating condition, wherein the evaluation value calculation part is configured to calculate a first refrigerant quantity index evaluation value as the refrigerant quantity index evaluation value, based on the reference refrigerant quantity index value having a value associated with an operating condition of interest and also based on the measured refrigerant quantity index value, in a first period in which it is previously estimated that no refrigerant leakage of the refrigerant in the air conditioning system has occurred, and calculate a second refrigerant quantity index evaluation value as the refrigerant quantity index evaluation value, based on the reference refrigerant quantity index value having a value associated with the operating condition of interest and also based on the measured refrigerant quantity index value, in a second period in which the refrigerant quantity is diagnosed, and wherein the refrigerant quantity diagnosis part is configured to compare information on the first refrigerant quantity index evaluation value with information on the second refrigerant quantity index evaluation value and thereby diagnose the refrigerant quantity in the air conditioning system.

2. The refrigerant quantity diagnosis device according to claim 1, wherein the reference refrigerant quantity index value is calculated based on a calculation using a simulator, a test result of the air conditioning system, or operating state data thereof collected via a network.

3. The refrigerant quantity diagnosis device according to claim 1, wherein the refrigerant quantity diagnosis part is configured to calculate a first average value which is an average value of a plurality of calculated first refrigerant quantity index evaluation values in the first period, as information on the first refrigerant quantity index evaluation value calculated in the first period, and also calculate a second average value which is an average value of a plurality of calculated second refrigerant quantity index evaluation values in the second period, as information on the second refrigerant quantity index evaluation value calculated in the second period, and compare the first average value with the second average value and thereby diagnose the refrigerant quantity.

4. The refrigerant quantity diagnosis device according to claim 3, wherein the refrigerant quantity diagnosis part is configured to calculate a weighted average of each of the first refrigerant quantity index evaluation value and the second refrigerant quantity index evaluation value, using a weighting coefficient which is changed in accordance with the prescribed value of the associated operating condition, and thereby calculate the first average value and the second average value.

5. The refrigerant quantity diagnosis device according to claim 4, wherein the weighting coefficient has a larger value when an air-conditioning load in the air conditioning system is higher, compared to a value when the air-conditioning load in the air conditioning system is lower.

6. The refrigerant quantity diagnosis device according to claim 1, wherein the reference refrigerant quantity index value is stored in a storage part, and wherein the storage part stores therein the reference refrigerant quantity index value as a function which uses the operating condition as a parameter, or as a map in which the prescribed value of the associated operating condition is made to correspond to the reference refrigerant quantity index value.

7. The refrigerant quantity diagnosis device according to claim 1, wherein the operating condition includes at least one of an outside air temperature, a pressure on a high-pressure side of a refrigeration cycle of interest, and a rotation rate of a compressor of interest.

8. The refrigerant quantity diagnosis device according to claim 1, wherein the refrigerant quantity diagnosis device is disposed separately from the air conditioning system, and wherein the refrigerant quantity diagnosis device acquires the operating state data from the air conditioning system via communication.

9. The refrigerant quantity diagnosis device according to claim 1, wherein a result of a diagnosis by the refrigerant quantity diagnosis part is outputted to an output part.

10. The refrigerant quantity diagnosis device according to claim 9, wherein the refrigerant quantity diagnosis device is disposed in an indoor unit included in the air conditioning system, and wherein the output part is disposed in the indoor unit.

11. A refrigerant system, comprising:

an air conditioning system; and a refrigerant quantity diagnosis device that comprises a data collection part configured to acquire operating state data on the air conditioning system, an evaluation value calculation part configured to calculate a refrigerant quantity index evaluation value that is a ratio of (i) a measured refrigerant quantity index value which is an index value of a quantity of a refrigerant in the air conditioning system and is calculated based on the acquired operating state data, to (ii) a reference refrigerant quantity index value which is a previously-calculated index value of the refrigerant quantity in the air conditioning system, or a difference value between (i) the measured refrigerant quantity index value and (ii) the reference refrigerant quantity index value, and a refrigerant quantity diagnosis part configured to diagnose the refrigerant quantity in the air conditioning system, based on the refrigerant quantity index evaluation value, wherein the reference refrigerant quantity index value is associated with at least one operating condition of the air conditioning system and is also associated with a prescribed value of the associated operating condition, wherein the evaluation value calculation part is configured to
  calculate a first refrigerant quantity index evaluation value as the refrigerant quantity index evaluation value, based on the reference refrigerant quantity index value having a value associated with an operating condition of interest and also based on the measured refrigerant quantity index value, in a first period in which it is previously estimated that no refrigerant leakage of the refrigerant in the air conditioning system has occurred, and
  calculate a second refrigerant quantity index evaluation value as the refrigerant quantity index evaluation value, based on the reference refrigerant quantity index value having a value associated with the operating condition of interest and also based on the measured refrigerant quantity index value, in a second period in which the refrigerant quantity is diagnosed, and
wherein the refrigerant quantity diagnosis part is configured to compare information on the first refrigerant quantity index evaluation value with information on the second refrigerant quantity index evaluation value and thereby diagnose the refrigerant quantity in the air conditioning system.

12. The refrigerant system according to claim 11,
wherein the refrigerant system is installed in a railroad vehicle.

13. The refrigerant system according to claim 11,
wherein the refrigerant system is installed in an automobile.

14. A refrigerant quantity diagnosis method of a refrigerant quantity diagnosis device for an air conditioning system, the refrigerant quantity diagnosis device including a data collection part, an evaluation value calculation part, and a refrigerant quantity diagnosis part, the refrigerant quantity diagnosis method, comprising:
  a step, performed by the data collection part, of acquiring operating state data on the air conditioning system;
  a step, performed by the evaluation value calculation part, of calculating a refrigerant quantity index evaluation value that is a ratio of (i) a measured refrigerant quantity index value which is an index value of a quantity of a refrigerant in the air conditioning system and is calculated based on the acquired operating state data, to (ii) a reference refrigerant quantity index value which is a previously-calculated index value of the refrigerant quantity in the air conditioning system, or a difference value between (i) the measured refrigerant quantity index value and (ii) the reference refrigerant quantity index value; and
  a step, performed by the refrigerant quantity diagnosis part, of diagnosing the refrigerant quantity in the air conditioning system, based on the refrigerant quantity index evaluation value,
wherein the reference refrigerant quantity index value is associated with at least one operating condition of the air conditioning system and is also associated with a prescribed value of the associated operating condition,
the refrigerant quantity diagnosis method, further comprising:
a first refrigerant quantity index evaluation value calculation step, performed by the evaluation value calculation part, of calculating a first refrigerant quantity index evaluation value as the refrigerant quantity index evaluation value, based on the reference refrigerant quantity index value having a value associated with an operating condition of interest and also based on the measured refrigerant quantity index value, in a first period in which it is previously estimated that no refrigerant leakage of the refrigerant in the air conditioning system has occurred, and
a second refrigerant quantity index evaluation value calculation step, performed by the evaluation value calculation part, of calculating a second refrigerant quantity index evaluation value as the refrigerant quantity index evaluation value, based on the reference refrigerant quantity index value having a value associated with the operating condition of interest and also based on the measured refrigerant quantity index value, in a second period in which the refrigerant quantity is diagnosed, and
a diagnosis step performed by the refrigerant quantity diagnosis part, of comparing information on the first refrigerant quantity index evaluation value with information on the second refrigerant quantity index evaluation value and thereby diagnosing the refrigerant quantity in the air conditioning system.

* * * * *